US012751472B2

(12) United States Patent
Bell et al.

(10) Patent No.: US 12,751,472 B2
(45) Date of Patent: Oct. 6, 2026

(54) NON-DAIRY CREAMER FORMULATION

(71) Applicant: Whitewave Services, Inc., Denver, CO (US)

(72) Inventors: Brandon Eugene Bell, Denver, CO (US); James Matthew Owen, Denver, CO (US)

(73) Assignee: WHITEWAVE SERVICES, INC., Denver, CO (US)

( * ) Notice: Subject to any disclaimer, the term of this patent is extended or adjusted under 35 U.S.C. 154(b) by 0 days.

(21) Appl. No.: 17/223,285

(22) Filed: Apr. 6, 2021

(65) Prior Publication Data

US 2021/0219577 A1 Jul. 22, 2021

Related U.S. Application Data

(63) Continuation of application No. 15/798,684, filed on Oct. 31, 2017, now abandoned.

(60) Provisional application No. 62/415,745, filed on Nov. 1, 2016.

(51) Int. Cl.

| | |
|---|---|
| ***A23L 2/52*** | (2006.01) |
| ***A23C 11/04*** | (2025.01) |
| ***A23C 11/06*** | (2025.01) |
| ***A23F 5/46*** | (2006.01) |
| ***A23L 27/00*** | (2016.01) |

(52) U.S. Cl.

CPC ................ *A23L 2/52* (2013.01); *A23C 11/04* (2013.01); *A23C 11/06* (2013.01); *A23F 5/46* (2013.01); *A23L 27/80* (2016.08); *A23C 2210/30* (2013.01); *A23C 2270/10* (2013.01); *A23V 2002/00* (2013.01)

(58) Field of Classification Search

CPC ............. A23L 2/52; A23L 27/80; A23C 11/06
USPC .......................................................... 426/590
See application file for complete search history.

(56) References Cited

U.S. PATENT DOCUMENTS

| | | | |
|---|---|---|---|
| 1,800,156 | A | 4/1931 | Rotheim |
| 2,294,172 | A | 8/1942 | Getz |
| 2,577,245 | A | 12/1951 | Tuttle et al. |
| 2,704,172 | A | 3/1955 | Lapin |
| 2,729,368 | A | 1/1956 | Lapin et al. |
| 2,953,284 | A | 9/1960 | Prussin et al. |
| 2,957,611 | A | 10/1960 | Sagarin |
| 2,977,231 | A | 3/1961 | Fox et al. |
| 3,117,699 | A | 1/1964 | Epstein |
| 3,123,260 | A | 3/1964 | Miles |
| 3,224,883 | A | 12/1965 | Pader et al. |
| 3,519,440 | A | 7/1970 | Staackmann et al. |
| 4,046,926 | A | 9/1977 | Gardiner |
| 4,380,306 | A | 4/1983 | Knopf |
| 4,407,838 | A | 10/1983 | Rule et al. |
| 4,438,147 | A | 3/1984 | Hedrick, Jr. |
| 4,531,659 | A | 7/1985 | Wright |
| 4,572,406 | A | 2/1986 | Pratt et al. |
| 4,596,343 | A | 6/1986 | Ford, Jr. |
| 4,640,440 | A | 2/1987 | Ford, Jr. et al. |
| 4,694,975 | A | 9/1987 | Hagan |
| 4,752,465 | A | 6/1988 | Mackles |
| 5,040,705 | A | 8/1991 | Snell |
| 5,211,317 | A | 5/1993 | Diamond et al. |
| 5,281,387 | A | 1/1994 | Collette et al. |
| 5,350,591 | A | 9/1994 | Canton |
| 5,462,759 | A | 10/1995 | Westerbeek et al. |
| 5,520,877 | A | 5/1996 | Collette et al. |
| 5,667,832 | A | 9/1997 | Tromans |
| 5,670,194 | A | 9/1997 | Fuller et al. |
| 5,687,911 | A | 11/1997 | Boakye-Danquah et al. |
| 5,725,129 | A | 3/1998 | Chapin et al. |
| 5,780,092 | A | 7/1998 | Agbo et al. |
| 5,829,614 | A | 11/1998 | Collette et al. |
| 5,863,577 | A | 1/1999 | Lynch et al. |
| 5,906,285 | A | 5/1999 | Slat |
| 5,997,936 | A | 12/1999 | Jimenez-Laguna |
| 6,095,378 | A | 8/2000 | Potts et al. |
| 6,129,943 | A | 10/2000 | Zeller et al. |
| 6,180,159 | B1 * | 1/2001 | Villagran ................ A23F 3/163 426/654 |
| 6,228,415 | B1 | 5/2001 | Jimenez-Laguna et al. |
| 6,287,616 | B1 | 9/2001 | Beeson et al. |
| 6,291,006 | B1 | 9/2001 | Butterbaugh et al. |

(Continued)

FOREIGN PATENT DOCUMENTS

| | | |
|---|---|---|
| EP | 0213406 | 3/1987 |
| EP | 0281986 | 9/1988 |

(Continued)

OTHER PUBLICATIONS

Anon, Homogenizers, Tetrapak Dairy Procecessing Handbook, accessed at https://dairyprocessinghandbook.tetrapak.com/chapter/homogenizers, Sep. 18, 2015 (Anon).*

(Continued)

*Primary Examiner* — Nikki H. Dees
*Assistant Examiner* — Philip A Dubois
(74) *Attorney, Agent, or Firm* — Barnes & Thornburg LLP

(57) ABSTRACT

Pressurized non-dairy compositions that can be expelled from a pressurized container, typically through an actuator, into a beverage are described. Upon combining the non-dairy composition with the beverage, a portion of the non-dairy composition provides a stable foam on top of the beverage ("foaming") and a portion of the non-dairy composition is mixed into and remains in the beverage ("creaming").

10 Claims, No Drawings

(56) References Cited

U.S. PATENT DOCUMENTS

| | | | |
|---|---|---|---|
| 6,340,103 | B1 | 1/2002 | Scheindel et al. |
| 6,345,735 | B1 | 2/2002 | Harvey et al. |
| 6,368,652 | B1 | 4/2002 | Heertje et al. |
| 6,379,737 | B1 | 4/2002 | Butterbaugh et al. |
| 6,386,400 | B1 | 5/2002 | Scheindel |
| 6,482,390 | B1 | 11/2002 | Hiscocks et al. |
| 6,488,974 | B1 | 12/2002 | Kuchner et al. |
| 6,491,187 | B2 | 12/2002 | Walters |
| 6,510,967 | B1 | 1/2003 | DeSimone |
| 6,534,108 | B2 | 3/2003 | Jimenez-Laguna et al. |
| 6,551,638 | B1 | 4/2003 | Dodd et al. |
| 6,607,106 | B2 | 8/2003 | Henry et al. |
| 6,612,468 | B2 | 9/2003 | Pritchett et al. |
| 6,669,973 | B1 | 12/2003 | Jolivet |
| 6,695,177 | B2 | 2/2004 | Blicher |
| 6,713,114 | B2 | 3/2004 | Klein et al. |
| 6,820,777 | B2 | 11/2004 | Frutin |
| 6,832,487 | B1 | 12/2004 | Baker |
| 6,868,990 | B2 | 3/2005 | Cater et al. |
| 6,872,416 | B2 | 3/2005 | Chmiel et al. |
| 6,896,920 | B1 | 5/2005 | Forman et al. |
| 6,959,524 | B2 | 11/2005 | Altonen et al. |
| 6,969,524 | B1 | 11/2005 | Tabata et al. |
| 7,017,772 | B2 | 3/2006 | Meiland et al. |
| 7,028,866 | B2 | 4/2006 | Kunesh et al. |
| 7,062,937 | B1 | 6/2006 | Baker et al. |
| 7,077,291 | B1 | 7/2006 | Bell et al. |
| 7,090,880 | B1 | 8/2006 | Droste et al. |
| 7,104,531 | B2 | 9/2006 | Page et al. |
| 7,137,536 | B2 | 11/2006 | Walters et al. |
| 7,137,537 | B2 | 11/2006 | Rueschhoff et al. |
| D547,651 | S | 7/2007 | Simpson, Jr. et al. |
| 7,246,722 | B2 | 7/2007 | Walters et al. |
| 7,249,692 | B2 | 7/2007 | Walters et al. |
| 7,279,188 | B2 | 10/2007 | Arrick et al. |
| 7,303,087 | B2 | 12/2007 | Flashinski et al. |
| 7,344,707 | B2 | 3/2008 | Smith et al. |
| 7,377,454 | B2 | 5/2008 | Klopfenstein et al. |
| 7,448,517 | B2 | 11/2008 | Shieh et al. |
| 7,537,138 | B2 | 5/2009 | Saggin et al. |
| 7,703,618 | B2 | 4/2010 | Derrien |
| 7,708,159 | B2 | 5/2010 | Darr et al. |
| 7,721,920 | B2 | 5/2010 | Ruiz De Gopegui et al. |
| 7,780,025 | B2 | 8/2010 | Simpson, Jr. et al. |
| 7,790,211 | B2 | 9/2010 | Eijsackers et al. |
| 7,856,921 | B2 | 12/2010 | Arrick et al. |
| 7,878,108 | B2 | 2/2011 | Mock et al. |
| 7,882,990 | B1 | 2/2011 | Walters et al. |
| 7,963,088 | B2 | 6/2011 | Simpson, Jr. et al. |
| 8,043,552 | B2 | 10/2011 | Outreman |
| 8,074,562 | B2 | 12/2011 | Dworzak et al. |
| 8,074,847 | B2 | 12/2011 | Smith |
| 8,465,728 | B2 | 6/2013 | Tasz et al. |
| D757,544 | S | 5/2016 | Barenhoff et al. |
| 2001/0006695 | A1 | 7/2001 | Jimenez-Laguna et al. |
| 2001/0023877 | A1 | 9/2001 | Walters |
| 2002/0150657 | A1 | 10/2002 | Farr et al. |
| 2002/0162458 | A1 | 11/2002 | Farr et al. |
| 2003/0006252 | A1 | 1/2003 | Henry et al. |
| 2003/0205586 | A1 | 11/2003 | Blicher |
| 2004/0011824 | A1 | 1/2004 | Walters et al. |
| 2004/0047964 | A1 | 3/2004 | Groux et al. |
| 2004/0076730 | A1 | 4/2004 | Wilkinson |
| 2004/0086612 | A1 | 5/2004 | Antheunisse et al. |
| 2004/0105923 | A1 | 6/2004 | O'Connell |
| 2004/0109928 | A1 | 6/2004 | O'Connell |
| 2004/0149781 | A1 | 8/2004 | Kunesh et al. |
| 2004/0256418 | A1 | 12/2004 | Scheindel |
| 2005/0001340 | A1 | 1/2005 | Page et al. |
| 2005/0025872 | A1* | 2/2005 | Joseph .................. A23D 7/011 426/601 |
| 2005/0115415 | A1 | 6/2005 | Arrick et al. |
| 2005/0224518 | A1 | 10/2005 | Walters et al. |
| 2005/0276898 | A1 | 12/2005 | Pascual et al. |
| 2006/0000853 | A1 | 1/2006 | Rueschhoff et al. |
| 2006/0006201 | A1 | 1/2006 | Rueschhoff et al. |
| 2006/0042192 | A1 | 3/2006 | Levy et al. |
| 2006/0060554 | A1 | 3/2006 | Garman |
| 2006/0073256 | A1 | 4/2006 | Destaillats et al. |
| 2006/0113327 | A1 | 6/2006 | Walters et al. |
| 2006/0125128 | A1 | 6/2006 | Page et al. |
| 2006/0180612 | A1 | 8/2006 | Paas et al. |
| 2006/0201332 | A1 | 9/2006 | Klopfenstein |
| 2006/0233921 | A1 | 10/2006 | Mock et al. |
| 2007/0009636 | A1 | 1/2007 | Sher et al. |
| 2007/0065555 | A1 | 3/2007 | Soane et al. |
| 2007/0125742 | A1 | 6/2007 | Simpson et al. |
| 2007/0175927 | A1 | 8/2007 | Ozanne et al. |
| 2007/0178213 | A1* | 8/2007 | Ketchmark .......... A23C 9/1307 426/583 |
| 2007/0199452 | A1 | 8/2007 | Dworzak et al. |
| 2007/0205175 | A1 | 9/2007 | Darr et al. |
| 2007/0210026 | A1 | 9/2007 | Darr et al. |
| 2007/0241132 | A1 | 10/2007 | Smith |
| 2007/0292584 | A1 | 12/2007 | Arrick et al. |
| 2008/0003387 | A1 | 1/2008 | Altonen et al. |
| 2008/0014315 | A1 | 1/2008 | DeLease |
| 2008/0017671 | A1 | 1/2008 | Shieh et al. |
| 2008/0035601 | A1 | 2/2008 | Derrien |
| 2008/0093382 | A1 | 4/2008 | Sher et al. |
| 2008/0179271 | A1 | 7/2008 | Bangi |
| 2008/0179350 | A1 | 7/2008 | Neuhaus et al. |
| 2008/0193622 | A1 | 8/2008 | Haedelt et al. |
| 2008/0286421 | A1 | 11/2008 | DeLease et al. |
| 2009/0152501 | A1 | 6/2009 | Canessa et al. |
| 2009/0194561 | A1 | 8/2009 | Quasters |
| 2009/0229704 | A1 | 9/2009 | Simpson, Jr. et al. |
| 2009/0263487 | A1 | 10/2009 | Kwon |
| 2010/0009052 | A1 | 1/2010 | Canessa et al. |
| 2010/0021582 | A1 | 1/2010 | Kwon |
| 2010/0221392 | A1 | 9/2010 | Nakai et al. |
| 2010/0233316 | A1 | 9/2010 | Kwon |
| 2010/0237546 | A1 | 9/2010 | Outreman |
| 2010/0303971 | A1* | 12/2010 | Melms, Jr. ............. A23C 11/08 222/129 |
| 2010/0310727 | A1 | 12/2010 | Massey et al. |
| 2011/0017701 | A1 | 1/2011 | Soliman |
| 2011/0151068 | A1 | 6/2011 | Taylor |
| 2011/0174765 | A1 | 7/2011 | Patel et al. |
| 2011/0174827 | A1 | 7/2011 | Patel et al. |
| 2011/0183047 | A1 | 7/2011 | Goglio |
| 2011/0189372 | A1 | 8/2011 | Sher et al. |
| 2011/0189373 | A1 | 8/2011 | Beeson et al. |
| 2011/0266186 | A1 | 11/2011 | Outreman |
| 2011/0266722 | A1 | 11/2011 | Outreman |
| 2012/0027907 | A1 | 2/2012 | Haedelt et al. |
| 2013/0330460 | A1 | 12/2013 | Criezis et al. |
| 2015/0056360 | A1 | 2/2015 | Beeson et al. |
| 2015/0140170 | A1 | 5/2015 | Borcherding et al. |

FOREIGN PATENT DOCUMENTS

| | | | |
|---|---|---|---|
| EP | 1099384 | | 5/2001 |
| EP | 1609742 | | 12/2005 |
| EP | 1668992 | | 6/2006 |
| EP | 1797772 | | 6/2007 |
| EP | 1791769 | | 3/2011 |
| WO | 9521535 | A1 | 8/1995 |
| WO | 97/33813 | | 9/1997 |
| WO | 2004071203 | | 8/2004 |
| WO | 2006032113 | | 3/2006 |
| WO | 2009019486 | | 2/2009 |
| WO | 2009024200 | | 2/2009 |
| WO | 2009037493 | | 3/2009 |
| WO | 2010091871 | | 8/2010 |
| WO | 2011049556 | | 4/2011 |
| WO | 2012010378 | | 1/2012 |
| WO | 2012143515 | | 10/2012 |
| WO | 2016196708 | | 12/2016 |
| WO | 2017162701 | | 9/2017 |

(56) References Cited

FOREIGN PATENT DOCUMENTS

| | | |
|---|---|---|
| WO | 2017162715 | 9/2017 |
| WO | 2017216194 | 12/2017 |

OTHER PUBLICATIONS

Marchesini, Effect of high-pressure homogenization on droplet size distribution, Journal of Dairy Science vol. 92 No. 5, 2009.*

Anon, Homogenizers, Tetrapak Dairy Processing Handbook, accessed at https://ia804506.us.archive.org/10/items/DairyProcessingHandbookTetrapak/Dairy-Processing-Handbook-Tetrapak.pdf, 1995 (Anon).*

Mexican Office Action issued Mar. 19, 2014, for Mexican Patent Application No. MX/a/2010/006065, filed Jun. 2, 2010 and its English translation.

Mexican Office Action, issued Dec. 1, 2014 for Mexican Patent Application No. MX/a/2010/006065, filed Jun. 2, 2010 and its English translation.

Web page from Precision, a Precision Valve Company found at: http://www.precisionglobal.com/en/resources/technical-reference, pp. 1-2.

Weekly Weigh-In, Dessert topping brawl!!!, [on-line] Jul. 12, 2007, retrieved Jun. 6, 2012, from Hungry Girl—Thursday Newsletter found at: http://www.hungry-girl.com/nesletters/raw/797, pp. 1-3.

Garti, et al., "Crystallization Processes in Fats and Lipid Systems", Marcel Dekker, New York, 2001, Air Incorporation, p. 346.

Christiansen, et al., "Hydrolyzed whey proteins as emulsifiers and stabilizers in high-pressure processed dressings", Food Hydrocolloids, 18 (2004), pp. 757-767.

Amendment and Response as filed Jun. 5, 2020 in Response to Non-final Office Action issued in U.S. Appl. No. 15/800,211, filed Jan. 7, 2020.

U.S. Office Action issued on Jan. 7, 2020 in U.S. Appl. No. 15/800,211.

Amendment and Response as filed on Jun. 11, 2020 in Response to Non-final Office Action issued in U.S. Appl. No. 15/852,040, filed Jan. 13, 2020.

U.S. Office Action issued on Jan. 13, 2020 in U.S. Appl. No. 15/852,040.

Milk Protein Concentrate, American Dairy Institute, accessed at https:/www.adpi.org/DairyProducts/DryMilks/MilkProteinConcentrate/tabid/357/Default.aspx.American.2020.

Amendment and Response as filed Apr. 2, 2020 in response to Non-final Office Action issued on Oct. 3, 2019 in U.S. Appl. No. 15/798,684, filed Oct. 31, 2017.

U.S. Office Action issued on Oct. 3, 2019 in U.S. Appl. No. 15/798,684, filed Oct. 21, 2017.

* cited by examiner

NON-DAIRY CREAMER FORMULATION

CROSS REFERENCE TO RELATED APPLICATIONS

This application is a continuation of utility patent application Ser. No. 15/798,684, filed on Oct. 31, 2017 and claims priority to provisional patent application 62/415,745 filed on Nov. 1 2016, the contents of which are incorporated herein in the entirety for all purposes.

FIELD OF THE INVENTION

The embodiments herein relate generally to pressurized non-dairy compositions that can be expelled from a pressurized container, typically through an actuator, into a beverage. Upon combining the non-dairy composition with the beverage (which is usually hot), a portion of the non-dairy composition provides a stable foam on top of the beverage ("foaming") and a portion of the non-dairy composition is mixed into and remains in the beverage ("creaming"). In one aspect, the embodiments can be considered a "one touch" latte, cappuccino, mocha, or a macchiato.

BACKGROUND OF THE INVENTION

The preparation of a latte, cappuccino, mocha, or macchiato can be time consuming, a bit awkward and/or unsafe and generally requires either an expensive apparatus to brew the hot beverage and/or dairy product or the need to visit a specialty beverage shop to have a barista prepare the drink of choice. Going to a specialty shop also increases the cost of purchasing such a beverage versus the preparation at home.

Generally, the dairy or non-dairy (for example, soy or almond milk) composition is heated with steam to form a foam and/or a heated dairy composition. The generation of steam to froth the dairy product can be problematic with back splashing of the dairy composition which could scald or burn the operator. Additionally, touching the heated container that contains the hot dairy composition can also lead to scalding or burning of the operator. In certain instances, the operator may overheat the dairy composition so that it is not useful in the beverage and requires that it be discarded and a new portion of dairy composition be subjected to heating again, thus possibly causing waste of the dairy composition.

If the operator does prepare the heated dairy composition in the convenience of a home or office, a fairly expensive apparatus is required to generate the steam to froth the dairy composition. Locating such an apparatus can be problematic as it may not fit well in a home kitchen or office setting due to cost, size, and/or complexity (e.g., necessarily having water lines connected to the apparatus or providing containers of water to be used in the generation of steam).

For example, the optimum effect is discernible in milk from the mid stratum where small bubbles predominate. Too much heat will destroy the structure of the milk sugars leading to their caramelization and the resultant over-heated milk will mask the flavor and presence of the majority of natural beverage, e.g., coffee essences. The milk will effectively undergo a phase separation, lose frothiness and, apart from scalding the mouth of the consumer, it will cause the beverage, e.g., coffee to develop scorched off-flavors and possible curdling due to the denaturing of the proteins.

If the consumer decides to visit a specialty shop, added costs to prepare the beverage of choice are incurred versus the preparation by the consumer at home or in the office.

Therefore, a need exists for the preparation of a product that overcomes one or more of the current disadvantages noted above.

BRIEF SUMMARY OF THE INVENTION

The present invention surprisingly provides a pressurized composition (non-dairy), a product comprising the pressurized composition in a delivery system or apparatus, and methods to modify beverages, typically by delivering the composition (nondairy) from the system or apparatus, useful in the preparation of beverages. The present invention also provides beverages that comprise the composition (non-dairy), such that a beverage with a foamed or frothed layer is provided, wherein a portion of the composition (non-dairy) is mixed in the beverage and a portion remains on top of the beverage.

The products and non-dairy compositions described herein provide advantages over lattes. The non-dairy compositions described herein are refrigerated. Therefore, a consumer can go to the refrigerator, grasp the container, shake the container and the contents therein and eject the non-dairy composition into a hot beverage. Thus, the non-dairy compositions described herein allow the beverage to be consumed immediately after preparation due to the chilled non-dairy creamer, rather than have to wait for a period of time at the coffee shop to let it cool.

Another advantage of the non-dairy compositions described herein provide flavoring. The non-dairy compositions can sweeten, flavor, and can cream both the body of the coffee and the resultant foam layer.

The product comprises a delivery system, where the composition is pressurized. It is mentioned the systems, or components thereof, containing the pressurized composition can themselves be considered as a pressurized system or components. In one aspect, a delivery system includes a container, such as a can or bottle, a valve and spring assembly and an actuator system. The container has an opening configured to secure attachment of the actuator system to the container. The valve and spring assembly is securely attached to the container and is in communication with the actuator and container such that the container can be pressurized. It is mentioned that the product typically comprises a single composition and a single delivery system.

In one aspect, the actuator system comprises a skirt comprising an upper portion and a lower portion, wherein the skirt has a first diameter. A base is attached to the skirt via a hinge portion. In one embodiment, the base has an opening, wherein the base has a second diameter that is less than the inner circumference of the skirt, creating a gap between the skirt and the base.

A nozzle protrudes from the base having a tip portion and a bottom portion, wherein the bottom portion of the nozzle, e.g., a curved nozzle, is in communication with the opening of the base and wherein the nozzle has an inner diameter as a through bore.

A touch pad is attached to the nozzle having an outer portion and an inner portion.

Optionally, an enclosing cap can be removably attached to the actuator or container. For example an interior bottom portion of the enclosing cap is releasably engaged to an annular skirt of the actuator or to a groove or rib of the container via a snap fit.

In one aspect, when the non-dairy composition (which is typically chilled in a refrigerator) is ejected into a hot beverage, such as coffee or tea, water vapor is created which creates an authentic quality latte steam. In another aspect, when the non-dairy composition (which is typically chilled in a refrigerator) is ejected, a sound is created which creates an authentic quality latte impression.

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the detailed descriptions are to be regarded as illustrative in nature and not restrictive.

DETAILED DESCRIPTION

In the specification and in the claims, the terms "including" and "comprising" are open-ended terms and should be interpreted to mean "including, but not limited to . . . " These terms encompass the more restrictive terms "consisting essentially of" and "consisting of."

It must be noted that as used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", "characterized by" and "having" can be used interchangeably.

The term "brewed" refers to a process whereby one or more chemical constituents of a beverage's flavor base (e.g., seeds, herbs, tea leaves, coffee beans, and the like, and combinations thereof) are dissolved in a liquid (e.g., water) through a process of steeping, stewing, soaking, marinating, immersion or the like. In some embodiments, the liquid is hot (e.g., at or near its boiling point) at some point during its contact with the beverage's flavor base.

In some embodiments, a beverage in accordance with the present teachings is tea-based. This would include a beverage derived from a brewing process in which one or more soluble compounds of tea leaves are extracted by hot water and/or steam. Representative tea-based beverages in accordance with the present teachings can prepared from a variety of types of teas including but are not limited to white tea, yellow tea, green tea, oolong, tea, black tea, post-fermented tea, herbal tea (i.e., leaves, flowers, fruit, herbs or other plant material which, technically, are not teas inasmuch as they are devoid of *Camellia sinensis*), and the like, and combinations thereof. Representative types of tea-based beverages in accordance with the present teachings include but are not limited to bata bata, bubble tea (foam tea), cha manao, cha yen (Thai tea), chai (masala chai), Hong Kong milk tea (pantyhose milk tea), iri ko, kashmiri chai, kombucha, matcha, obuku cha, sweet tea, tapioca pearl tea (boba tea), tea punch, the tank (Malaysian pulled tea), Tibetan yak butter tea, and the like, and combinations thereof.

In some embodiments, a beverage in accordance with the present teachings is coffee-based. A coffee-based beverage is derived from a brewing process in which one or more soluble compounds of coffee beans are extracted from ground coffee beans by hot water and/or steam. The coffee-based beverage can be produced from a specific type of coffee bean (e.g., Kona bean) or from a blend of different types of beans grown in different geographical areas. Representative bean types include but are not limited to Columbian, Ethiopian, Sumatra, Jamaica Blue Mountain, Panama, and the like, and combinations thereof.

Further, the compositions described herein can be delivered to beverages and food stuffs such as, for example and not limited to, hot cocoa, cold coffee, cold tea, milkshakes, frappes, ice cream, cookies, cakes, sodas, soups, etc.

Thus the term "beverage" as referred to herein, denotes tea based or coffee based products and other products described herein that can be treated with the compositions described hereinbefore consumption by an individual.

The term "latte" refers to a coffee drink made with espresso and steamed milk, typically 1 part espresso and 3 parts milk Typically the milk is steamed through a special high pressure steam pipe on the espresso machine. This serves two functions. To warm up the milk and to create a foam on the top.

The term "cappuccino" refers to a coffee drink that is traditionally prepared with espresso, hot milk, and steamed milk foam. Generally, a cappuccino is prepared as 1:1:1 ratio of espresso, steamed milk, and milk foam. Typically the milk is steamed through a special high pressure steam pipe on the espresso machine. This serves two functions. To warm up the milk and to create a stiff foam on the top.

The term "mocha" refers to a coffee drink based on espresso and hot milk, but with added chocolate, typically in the form of sweet cocoa powder, although many varieties use chocolate syrup.

The term "macchiato" is a cappuccino, but with the steamed milk component missing. That is, it is espresso and frothed milk foam only.

It should be understood that how the non-dairy composition is delivered by the consumer to the beverage will dictate whether the ultimate beverage would be considered, for example, a latte, cappuccino, mocha, macchiato, or a hybrid thereof (and similarly for the equivalents in tea). The present embodiments provide that the pressurized non-dairy composition is injected into the beverage with turbulence. After delivery, the non-dairy composition separates to form a foam layer and a portion remains intimately dispersed throughout the liquid beverage.

The present embodiments pertain to the delivery of a non-dairy composition to a beverage such that a portion of the non-dairy composition is mixed and is retained within the liquid beverage and a portion forms an upper layer on the surface of the liquid beverage and remains as a foamed layer for a period of time which the consumer drinks the beverage. A pressurized delivery system is provided that provides the non-dairy composition.

In the present application a "non-dairy composition" refers to a composition that is not substantially based on animal milk components. As a creamer composition, it is understood a non-dairy composition is substantially free-of milk fat or milk fat substitutes obtained from milk proteins, such as some microparticulated whey proteins. Herein non-dairy compositions can comprise some milk non-fat ingredients, such as proteins obtained from milk, for example caseinates or Milk Protein Concentrates (MPCs), in particular, in amounts of lower than 10.00% by weight, more particularly lower than 6.00% by weight, even more particularly lower than 5.00% by weight, in particular lower than 4.00% by weight, and more particularly lower than 3.00% by weight.

The delivery system includes a container, a valve and spring assembly and an actuator system. The container has an opening configured to secure attachment of the valve and spring assembly and/or the actuator system to the container. The valve and spring assembly is securably attached to the container and is in communication with the actuator and container such that the container can be pressurized.

In one aspect, the actuator system comprises an annular skirt comprising an upper portion and a lower portion, wherein the annular skirt has a first diameter. A circular base is attached to the annular skirt via a hinge portion. In one embodiment, the circular base has a second diameter that is less than the diameter of the annular skirt, creating a gap between the annular skirt and the circular base.

The actuator has a nozzle, presenting an opening between the interior of the actuator and open air. The actuator typically comprises a channel connecting the valve and spring assembly and the opening of the nozzle. The channel can be a part of the base of the actuator or can be connected to it, and is typically a part of the nozzle. For example a nozzle protrudes from the circular base having a tip portion and a bottom portion, wherein the bottom portion of the nozzle, e.g., a curved nozzle, is in communication with the opening of the circular base and wherein the nozzle has an inner diameter.

A touch pad is attached to the nozzle having an outer portion and an inner portion.

Optionally, an enclosing cap can be removably attached to the container or to the annular skirt.

Embodiments disclosed herein provide numerous technical advantages. According to one embodiment, the non-dairy composition can cream the beverage while also generating a head of foam on the surface of the beverage. The beverage can be creamed without requiring subsequent stirring. Additionally, the foam may have a strong structure that may be maintained when exposed to a hot beverage. The non-dairy composition can reduce problems associated with known beverage additives such as weak creaming, weak foaming, off-flavor, potential to cause splashing, requirements for significant headspace above the coffee in the cup, excessive cooling, and/or unsanitary packaging. According to one embodiment, the non-dairy composition can be used to prepare a coffee or tea based beverage in the home, school, office, hospital, or any place where a small container can be easily stored. For example, the non-dairy composition and delivery system can be portable, easy to use, safe, and/or low cost.

Container

The term "container" as used herein encompasses any vessel that that can be pressurized and allows for a valve and spring assembly to be attached such that the pressurized contents can be expelled from the container. Cans and bottles are included as exemplary types of containers such as those known in the art. The bottles can be made of glass or polymers, such as polyethylene terephthalate (PET), or polyethylene naphthalate (PEN) or other plastics. Cans typically are made of tinplate, tin-free-steel (TFS), aluminum, steel, or other suitable metals that can withstand pressurization. Suppliers of such containers include CCL Container Division, One Llodio Drive, Hermitage, PA, Crown Holdings, Inc., One Crown Way, Philadelphia, PA, Ball Corporation, Broomfield, Colorado, or DS containers, Batavia, Illinois. The containers can include a pressure release portion on the bottom of the container, such that a concave bottom is provided.

The size of the container is not limiting. However, most consumers prefer containers that hold approximately 10 to 16 ounces of pressurized contents, for example from about 25 to about 500 gram of composition, from about 50 grams to about 500 grams, from about 100 gram to about 500 grams, from about 300 grams to about 500 gram, for example 350 grams of non-dairy composition. Standard sized containers are known and can be utilized for the delivery of the pressurized contents within the container. In an embodiment, the product provides a single serving of from about 25 to 75 grams of composition, more particularly from 35 to 65 grams, even more particularly of from 40 to 60 grams. In another embodiment the product provides at least 2 servings, for example, up to 10 servings, more particularly from 4 to 8 servings, of from about 25 to 75 grams of composition, in particular of from 35 to 65 grams, more particularly of from 40 to 60 grams. For example a content of 350 grams is approximately enough material for the delivery of 7 servings, for example for the delivery of 7 days' worth of non-dairy "creamer" to a beverage or for seven servings.

The container can have an annular circumference, can be triangular, square, octagonal, etc. The shape of the container is not limiting.

The container, such as cans, can be made of a single piece, two pieces or three pieces of material to form the ultimate can as are known in the art.

The container will be enclosed such that a hole or opening is located at a position in the can such that a spring and valve assembly can be fitted to the container opening and sealed, usually by crimping, to provide a container that can be pressurized.

The container can include various coating(s) in the interior to help protect and maintain the integrity of the non-dairy composition during storage and use. Such coatings include polyamide imide (PAM) liners, epoxy phenolic (EP) liners and polyethylene terephthalates (PET) as exemplary coatings/liners of the container.

The container can be decorated with a "shrink sleeve," a pressure-sensitive, heat-transfer label, or other like means that conveys a marketing/branding message, nutritional information, ingredients statement, legal & selling communication, such as formula weight and barcode/universal formula code, and instructions on how to use the product and how to dispose/recycle the product. The consumer can initiate use of the product by first reviewing the instructions on the package. A tamper evident sleeve may indicate if the package has been previously opened or tampered with.

The tamper evident sleeve can enclose the entirety of the enclosing cap through to the bottom of the skirt. A perforated portion can be included in the tamper evident sleeve(s) to help the operator remove the protecting sleeve. Additionally, the tamper evident sleeve can be see through and include printing on the sleeve which provides nutritional or safety information on the sleeve. The tamper evident sleeve can envelop the entire package and separates at the cap for tamper evidence. This helps eliminate the need for adhesive to adhere the tamper evident sleeve to the container.

The protective sleeve that envelopes the enclosing cap, actuator (inside enclosing cap) and skirt can be adhered to the bottom of the skirt and steam shrunk to fit tightly about the apparatus. The protective sleeve can be perforated with one or two perforations. A vertical perforation can extend from the top of the protective sleeve to the bottom. A horizontal perforation can extend about the circumference of the skirt or enclosing cap.

Actuator System

The actuator system is placed in communication with the spring and valve assembly that is secured to the container. The actuator system includes several portions parts or components, such as, an optional skirt portion, a base portion and nozzle, a channel, and a touch pad attached to the base and/or to the nozzle.

The skirt comprises an upper portion and a lower portion. The annular skirt has a first circumference or diameter.

It should be understood that the term "skirt" as used herein, does not denote only a circular or annular configuration. Other configurations, such as trigonal, square, hexagonal, octagonal, etc. are included and in terms of the present embodiments, are considered "rings" as long as the "ring" is unitary and not discontinuous.

A base can be attached to the skirt, for example via a hinge portion, wherein the skirt and the base are attached at least through the hinge portion. The base has an opening, wherein the base has a second diameter or circumference that is less than the diameter or circumference of the skirt, creating a gap between the skirt and the base other than the hinge portion.

Again, it should be understood that the base can mirror the shape of the above-described skirt. That is, the base can be circular (if the skirt is annular), square (if the skirt is square), trigonal, hexagonal, octagonal, etc. to match the configuration of the above-described skirt.

A shaped nozzle protrudes from the base. The nozzle has a tip portion and a bottom portion. The bottom portion of the nozzle is in communication with the opening of the base so as to form a unitary structure between the base and the nozzle. The tip portion provides an opening between the interior of the actuator and open air. The nozzle opening can have opening portions or cross-sections of various forms, for example an annular section, for example a circular sections. Herein the dimension of the sections are referred to as a diameter. It will be understood that herein the diameter of a section that is not circular will be the diameter corresponding to the diameter of a circle having the same perimeter of the section. For example the diameter corresponding a square section will be the diameter of the circle having the same perimeter as the square defining the section.

The nozzle can vary in outer dimensions such that the bottom portion of the nozzle may have a circumference larger than the circumference at the tip portion. In this manner, the nozzle can be "flared" from the bottom portion to the tip portion if desired, thus providing additional strength to the nozzle while in use.

The nozzle can be linear in nature or can be curved to help deliver the non-dairy composition to the beverage.

The actuator typically comprises a channel connecting the valve and spring assembly and the opening of the nozzle. The connection is typically inserted into the top of a valve stem into the channel. The channel can be a part of the base of the actuator or can be connected to it, and it typically forms a part of the nozzle. The channel can internally protrude from the interior of the base, inside the actuator. Such a channel, for example, is depicted on FIG. 2 of document WO9733813. The channel can be for example, a tube, and can optionally be curved.

Typically, the gap between the base and the skirt is sufficient so that the base and the skirt are free in clear as to allow the base/nozzle to be tilted upon operation without interference from the skirt.

The term "hinge" or "living hinge" refers to a component of the actuator that connects the skirt to the base across the gap which is formed between the skirt and base as the skirt has a larger inner circumference than the outer circumference of the base. The living hinge helps provide support between the skirt and the base that are attached to the container so that the nozzle and base can be manipulated (bent or bowed) to help control the release of pressurized non-dairy composition through the spring and valve assembly connected to the nozzle through which the pressurized composition passes. By pressing against the nozzle/spring/valve assembly, the pressurized non-dairy composition is released from the can and the delivery can be controlled by the amount of pressure applied to the nozzle. The term "living hinge" is used in that the hinge continues to be flexible over the period of time of use until the contents of the container have been emptied.

Typically the hinge can have the same thickness or less than that of the skirt and the base. The hinge is wide enough to connect the skirt and base across the gap formed between the skirt and the base.

The actuator and its portions, parts or components, e.g. skirt, base, channel, nozzle, etc. can be prepared from various polymers, such as polyethylene, polypropylene, polybutadiene, homopolymers and copolymers thereof and the like and is not limiting.

Additives to the polymer utilized to prepare the actuator assembly can include anti-static agents and opacifiers or fillers. Typical opacifiers or fillers include silica. The opacifier or filler can be colored and can be, for example, red, white or blue. However any color of the spectrum can be used depending on the pigment selected.

An exemplary actuator is described in U.S. Design Pat. No. D757,544, issued May 31, 2016 by Swen Barenhoff et al., the contents of which are incorporated in their entirety for all purposes.

Spring-Valve Assembly

Spring-valve assemblies are known in the art and are not limiting with the embodiments described herein. Generally, a metal or plastic cup is crimped/swaged onto the opening of the container. A valve stem is inserted into the valve-spring assembly which generally includes a sealing gasket between the valve/spring assembly and the outer portion of the cup. A metering chamber/housing body is formed about the valve-spring assembly and connected, optionally, to a dip tube for uptake of the non-dairy composition. A dip tube is optionally attached to the spring-valve assembly to transport the pressurized non-dairy composition from the container through the valve stem and into the nozzle of the actuator for delivery of the non-dairy composition to a beverage.

Suitable valve-stem assemblies include, for example, those described in U.S. Pat. Nos. 4,572,406 and 8,465,728, the APTAR® VX-89 valve assembly, the teachings of which are incorporated herein in their entirety.

It should be understood that the actuator assembly and spring-valve assembly can include a 360 degree actuated valve system, a bag-on-valve system, and/or a valve system configured with or without a dip tube.

In one embodiment the spring and valve assembly has an "on and off" design, allowing two solely two positions: In the "off" position the spring and valve close the container, and the contents cannot be transferred out of the container. In the "on" position, obtained by pressing the actuator, the spring and valve open the container, and the contents are transferred out of the container through a hole arranged in the valve. Such an "on and off" design allows the delivery of the composition with a predefined flow, for example a predefined velocity and spread; and facilitates usage by the consumer.

In another embodiment, the spring and valve assembly has a progressive opening design, i.e. not an "on and off" design. That is, the consumer/operator is able to press the actuator, typically the touch pad, to control the amount and rate of composition delivered to a beverage or food product. With such a design the ejection velocity of the non-dairy composition from the pressurized container is adjustable. This is akin to a "gas pedal" where more pressure exerted to an automobile gas pedal results in the automobile going faster and decreasing pressure on the gas pedal results in the automobile slowing down. Thus the spring and valve assembly, nozzle and touch pad of the actuator can allow the consumer to speed up the delivery of the non-dairy composition or slow down the delivery as desired.

Cap

In one embodiment, an enclosing cap is secured over the actuator system.

Alternatively, the cap can extend over the entirety of the skirt and have a snap on feature to attach to the bottom of the skirt such that the cap surrounds the entirety of the actuator, the base, nozzle, and skirt. In this embodiment, the cap can include one or more protrusions about the bottom portion of the cap so as to have a snap fit to the bottom of the skirt.

The cap can be clear or opaque and be formed from the polymers and additives described herein.

In one aspect, the cap is formed as a see through material so that the consumer can visualize the actuator system and can appreciate the unique design of the actuator system.

Composition

The composition is typically a non-dairy composition. The composition is a liquid composition, comprising a sugar agent, fat, protein(s), at least one emulsifier, a stabilizer, at least one buffering agent, optimally a salt, optionally a sweetener, optionally an antioxidant, optionally a color, optimally a bulking agent, optionally flavoring and water. The fat is a vegetable oil, different from milk fat, for example a nut oil or a mixture of nut oils. The protein(s) comprise a caseinate such a sodium caseinate, and a Milk Protein Concentrate (MPC). Further optional proteins can be comprised in the composition, such as soy protein, whey protein, pea protein, pumpkin protein, hemp protein, and/or wheat protein, and/or egg proteins such as albumin. Egg albumin was found to not work well if used alone or solely combined with Caseinate as it produced an undesired after-taste, it did not create an ideal foam and is also an allergen.

The compositions include one or more foaming agents for creating and maintaining a head of foam. The foaming agents may include the proteins, emulsifiers, stabilizers, bulking agents, or a combinations thereof. The types and amounts of the foaming agents may be varied to generate a desired set of foam properties, such as volume, stability, softness or rigidity, thickening, binding, and/or moisture retention. Additionally, certain foaming agents can be selected to generate a desired set of overall formula properties that may not be specific to the foam. It has been surprisingly found that combining caseinate and MPC improves the foam quality.

As an example, some emulsifiers/stabilizers can be incorporated to maintain overall product stability. Examples of emulsifiers include Glycerin Fatty Acid Esters, Acetic Acid Esters of Mono and Diglycerides, Lactic Acid Esters of Mono and Diglycerides, Citric Acid Esters of Mono and Diglycerides, Succinic Acid Esters of Mono and Diglycerides, Diacetyl Tartaric Acid Esters of Mono and Diglycerides, Polyglycerol Esters of Fatty Acids, Polyglycerol Polyricinoleate, Sorbitan Esters of Fatty Acids, Propylene Glycol Esters of Fatty Acids, Sucrose Esters of Fatty Acids, Calcium Stearoyl Lactylate, Lecithin, Sodium Stearoyl Lactylate, Mono and Diglycerides, or combinations thereof.

Examples of stabilizers include Cellulose Gum, for example microcrystalline cellulose (MCC), Agar-agar, Carrageenan, Gellan Gum, Guar Gum, Konjac, Hydroxypropyl cellulose, Methylcellulose and Hydroxypropyl cellulose, Xanthan Gum, Gum Arabic, Starch, Pectin, Gelatin, Propylene Glycol Alginate, or combinations thereof. In some embodiments, the stabilizers can have a gel form, such as cellulose gel.

Examples of sugar agents and/or bulking agents include sugar, sucrose, saccharose, glucose, fructose, corn syrup, corn syrup solids, maltodextrin, dextrose, and mixtures thereof.

In some embodiments, the compositions can include one or more flavoring agents that may affect the taste of the formula. The flavoring agents can include salts, sweeteners and/or flavors.

The salt can be a common salt and/or a buffering salt. Common salts can be used as a preservative and/or a seasoning. Buffering salt can be used to maintain a suitable pH value, such as when the formula is added to an acidic liquid like coffee.

Buffering agents, such as buffering salts can improve the colloidal dispersibility (uniform distribution) of proteins and prevent protein coagulation (curdling).

In some embodiments, sweeteners can sweeten the taste of the formula. Examples of sweeteners include sugar agents and sweeteners different from sugar agents, for example high intensity sweeteners or non-nutritive sweeteners. Examples include, monosaccharides, disaccharides, and polysaccharides including sugars and sugar alcohols, such as sucrose, glucose, fructose, dextrose, maltose, lactose, high fructose corn syrup, corn syrup solids, invert sugar, agave, coconut sugar, honey, maple syrup, and sorbitol, xitlitol, stevia extracts or fermentive equivalents, such as steviol glycosides, aspartam, acesulfam, sucralose or a combination.

In some embodiments, flavor can distinguish the taste of the formula. Any suitable flavor can be used, such as vanilla, hazelnut, amaretto, Irish crème, cinnamon, butter pecan, chocolate, caramel, or any other flavor. In some embodiments, water can be used to dilute the formula, for example, to ensure the formula has a proper flavor intensity and viscosity when it is delivered from the package.

In some embodiments, the formula can include antioxidants to prevent lipid oxidation during shelf life. Examples of such antioxidants include BHA, BHT, propyl gallate, rosemary extract and tocopherols.

In certain aspects, the composition is a non-dairy composition comprising:

- water,
- from about 25 to about 40 percent by weight of a sugar agent such as sugar,
- from about 8 to about 16 percent by weight of an oil being coconut oil, palm kernel oil, or palm o coconut oil or palm kernel oil or palm oil or mixtures of coconut oil, palm kernel oil and/or palm oil,
- from about 0.5 to about 1.5 percent by weight of a milk protein concentrate,
- from about 0.5 to about 1.5 percent by weight of sodium caseinate,
- from about 0.2 to about 2 percent of a stabilizer, such as cellulose gel (Avicel),
- optionally a salt,
- at least one buffering agent such as dipotassium phosphate,
- an optional flavoring agent, such as vanilla, French vanilla, Irish cream, caramel, and the like such as International Flavors and Fragrances, Inc., (French vanilla), and
- from about 0.05 to about 0.6 percent by weight of at least one emulsifier, such as mono and di glycerides, lactylates, including stearoyl lactylates, such as sodium stearoyl lactylate (EMPLEX® SSL). Lactylates may be labelled as calcium stearoyl lactylate (CSL), sodium stearoyl lactylate (SSL), or lactylic esters of fatty acids (LEFA).

A caramel flavoring is available from International Flavors and Fragrances, Inc. (Ottens) as product number 62478 as a brown to light brown clear water soluble liquid as is a mocha flavoring, product number 62485 that is also a light amber to brown clear water soluble liquid. In another embodiment, cocoa powder can be used as the flavoring agent and is available from Barry Callebaut USA, LLC as item number 100084-722 that is processed with alkali.

With regard to sugar agents, in particular sugar, one can use components can be derived from any sugar source including for example corn, beets and cane. In one aspect, the sugar is from sugar cane.

Suitable oils useful in the non-dairy composition include, for example, coconut, palm kernel and palm oils or mixtures thereof, and in particular, coconut oil.

Milk protein concentrates (MPCs) are known in the art and are marketed as such. They comprise milk proteins (casein and whey) typically in a weight ratio similar to that in milk (about 80 wt % casein to 20 wt % whey), a limited amount of fat, and a limited amount of lactose, and some minerals. The protein content of MPCs is typically of higher than 50% by weight, more particularly higher than 60% and even more particularly higher than 70%. MPCs are different from milk powders such as Skim Milk Powder (SMP) in that significant amounts of lactose is removed. For example lactose in MPCs is typically lower than 20% by weight, for example, it is lower than 15%, on a dry basis, while lactose milk powders such as SMPs is typically of higher than 30% by weight on a dry basis. MPCs are different from whey concentrates or isolates, or casein concentrates or isolates in casein/whey ratios, whey concentrates or isolates having a ratio whey/casein much higher than the one in milk and casein concentrates or isolates having a ratio casein/whey much higher than the one in milk. Examples of MPCs that can be used in the compositions described herein include MPC 70 produced by Gay Lea. It is a concentrate manufactured from pasteurized cow's milk using ultrafiltration and processed using low temperature skim milk powder production parameters. The MPC can have a fat content of from 1.5 to 3%, moisture of from 4 to 5.5%, protein 70% as a minimum total weight percent and a pH of from 6 to 7.

Mono and diglycerides can be included in the composition, typically as emulsifiers and are provided, for example, as BFP 75K by Caravan Ingredients. BFP 75K is a mono-diglyceride emulsifier of fatty acids prepared from hydrogenated soybean oil containing a minimum of 52% monoglyceride content, with a melting point range of 62° C. to 65° C., free glycerin, 1.5% maximum, free fatty acid content of 1% as stearic acid and an iodine value maximum of 3.

The composition described herein can include a cellulose gel, for example a microcrystalline cellulose, such as an AVICEL® cellulose gel, including AVICEL® 1518 stabilizer having a viscosity, set up, 2.5% of 600 to 22 mPas (test method 16006), moisture (loss on drying) less than or equal to 6% by weight (test method 10001), particle size, less than or equal to 4.0% retained on USSS 250 μm (series #60) (test method 10202), total heavy metals of not more than 0.002% (20 ppm) (test method 52902). The material includes calcium chloride which is a carrier.

The composition contains, in one embodiment, hydrogenated coconut oil that is refined, bleached and deodorized and is made by Caldic and is referred to as VEGETOL® Hydro Coconut Oil 92 (product code VO24119).

A suitable dipotassium phosphate ($K_2HPO_4$) (50%) (potassium phosphate, dibasic) is available from FBC Industries, Inc.

In one aspect, a caseinate, such as a metal caseinate, e.g. sodium or potassium caseinate, is included in the composition. Such caseinates are highly soluble milk proteins that are dispersible in water. For example, an alkali metal salt caseinate such as ECCO 310 sodium caseinate available from ERIE Foods International, Inc. includes 93.5% protein by weight.

A sugar compound, typically sugar, such as cane sugar, is included in the compositions. Typically the sugar is provided in an aqueous solution having a Brix (% solids) of from about 65 to about 70 percent by weight, more particularly from about 66 to about 68 percent by weight and even more particularly about 67 weight percent (67.2 to 67.8 weight percent) in water with a pH of from about 6 to about 8.5 available from American Sugar Refining, Inc. or Redpath Sugar (specification number RLS-01).

Salt, sodium chloride, can also be included in the composition and one exemplary product is MORTON® CULINOX® Food Grade salt having a purity of greater than or equal to 99.95 weight percent.

A suitable non-dairy composition comprises from 45 to 55 percent by weight sugar (on a liquid basis at 67.5% brix), e.g., cane sugar, an oil such as coconut oil or palm kernel oil or palm oil or mixtures of coconut oil, palm kernel oil and/or palm oil in an amount of from about 8.5 to about 15.5 percent by weight, a milk protein concentrate in an amount of from 0.5 to about 1.5 percent by weight, a caseinate in an amount of from 0.5 to about 1.5 percent by weight, emulsifier(s) in an amount of from 0.05 to 0.6 percent by weight, microcrystalline cellulose in an amount of from 0.2 to about 0.75 percent by weight, dipotassium phosphate in an amount of from 0.2 to 0.8 percent by weight and water. Salt in an amount from 0.02 to about 1 percent by weight can be added to the composition.

Flavoring can be added to the composition in a weight percentage of from 0.1 to about 1 weight percent.

It should be understood that all ranges noted herein include the ranges subsumed from the minimum value to the maximum value. That is, for example, a range of from about 1 to about 10 includes ranges such as from about 2 to about 8, from about 2 to about 7, from about 3 to about 5, from 1 to about 7, etc. All combinations of minimum values to maximum values are included within the prescribed range.

For example, the non-dairy compositions described herein can include from about 25 to about 40 percent by weight sugar (dry weight), more particularly from about 31 to about 38 percent by weight, particularly from about 32 to about 37 percent by weight and even more particularly from about 34 to about 36 weight percent, etc.

The non-dairy compositions described herein can include from about 8 to about 16 percent by weight of a plant based oil, such as coconut oil or palm kernel oil or palm oil or mixtures of coconut oil, palm kernel oil and/or palm oil. Ranges include, for example from about 9 to about 15 percent by weight, from about 10 to about 14 percent by weight, from about 11 to about 13 percent by weight, from about 10 to about 15 percent by weight, etc.

The non-dairy compositions described herein can include from about 0.5 to about 1.5 percent by weight milk protein concentrate, more particularly from about 0.7 to about 1.2 percent by weight, from about 0.8 to about 1.1 percent by weight, from about 0.9 to about 1 percent by weight, from about 0.6 to about 1.4 percent by weight and from about 0.8 to about 1.2 percent by weight, etc.

To make milk protein concentrate, whole milk is first separated into cream and skim milk. The skim milk is then fractionated using ultrafiltration to make a skim concentrate that is lactose-reduced. This process separates milk components according to their molecular size. Milk then passes through a membrane that allows some of the lactose, minerals, and water to cross through. The casein and whey proteins, however, will not pass through the membrane due to their larger molecular size. The proteins, lactose, and minerals that do not go through the membrane are then spray dried. Spray drying and evaporation further concentrate the remaining materials to form a powder.

The non-dairy compositions described herein can include from about 0.5 to about 1.5 percent by weight of a caseinate, from about 0.6 to about 1.4 percent by weight, from about 0.7 to about 1.3 percent by weight, from about 0.8 to about 1.2 percent by weight, from about 0.5 to about 1.4 percent by weight, from about 0.5 to about 1.1 percent by weight, etc.

Casein is typically manufactured by adding acid to warm skim milk. As the pH of the skim milk lowers to the range of 4.2 to 4.6, the casein precipitates out of the skim milk as a curd. The casein curd is then washed repeatedly with acidified fresh water to "purify" the casein (wash away unwanted, occluded milk solids such as fat and lactose). Because the casein curd is kept at an acid pH, the milk minerals are leached out of the protein. The result is a relatively pure protein curd (96% protein on a dry basis).

Casein curd, however, is not very useful in food products. Acid casein (as the curd is known) is insoluble in water, behaving much like sand. In order to make the casein curd more useful in food products, the acid casein curd is reacted with a strong alkali to result in an almost neutral protein product termed a caseinate. The type of alkali used to neutralize the acid casein curd will determine what type of caseinate is produced. For example, reacting acid casein curd with sodium hydroxide (to a pH of about 6.8) results in the formation of sodium caseinate. Reacting acid casein curd with calcium oxide or calcium hydroxide (to pH 6.8 to 7.6) results in the formation of calcium caseinate. Sodium caseinate is the most water soluble form of caseinate. Sodium caseinate typically forms high viscosity water dispersions. Calcium caseinate forms a low viscosity, opaque, off white dispersion in water. Calcium caseinate is usually the least water soluble of the caseinates and tends to sediment out of suspension within hours of being mixed into water. Whereas sodium caseinate will exhibit a smooth mouthfeel when dispersed in water, calcium caseinate will exhibit a slightly gritty or grainy mouthfeel. There are also sodium calcium caseinates, calcium sodium caseinates, and even calcium ammonium caseinates. The levels of each mineral are determined by the ratios of alkali used in the caseinate manufacture. The higher the sodium content, the higher the viscosity and water solubility. The higher the calcium content, the lower the water viscosity and solubility. Potassium caseinate possesses properties similar to sodium caseinate Suitable caseinates include, for example, sodium caseinate, potassium caseinate and calcium caseinate.

It is mentioned that the compositions in particular comprise at most 10.00% by weight, for example, lower than 6.00% by weight, lower than 5.00% by weight, lower than 4.00% by weight, and lower than 3.00% by weight of proteins, an in particular of milk proteins. In particular, the Milk Protein Concentrate together with the caseinate represent at least 50% by weight, for example, at least 60%, more particularly at least 70%, even more particularly at least 80%, an even more particularly at least 90%, of all proteins comprised in the composition. It's been surprisingly found that good products, compositions and foam quality could be obtained with low amount of proteins, that are quite expensive.

The non-dairy compositions described herein can contain from about 0.2 to about 2 percent by weight microcrystalline cellulose, from about 0.3 to about 1.9 percent by weight, from about 0.4 to about 1.8 percent by weight, from about 0.5 to about 1.7 percent by weight, from about 0.6 to about 1.5 percent by weight, from about 0.2 to about 1.8 percent by weight, from about 0.2 to about 1.2 percent by weight, etc.

Microcrystalline cellulose (MCC) is pure partially depolymerized cellulose synthesized from α-cellulose precursor. The MCC can be prepared by different processes such as reactive extrusion, enzyme mediated, steam explosion and acid hydrolysis. Acid hydrolysis can be accomplished using mineral acids such as $H_2SO_4$, HCl and HBr as well as ionic liquids. These reagents destroy the amorphous regions remaining in the crystalline domains. The degree of polymerization is typically less than 400. The MCC particles with size lower than 5 μm should not be more than 10%.

The non-dairy compositions described herein can contain from about 0.05 to 0.3 percent by weight monoglycerides and diglycerides, from about 0.1 to about 0.2 percent by weight, from about 0.07 to about 0.2 percent by weight, from about 0.07 to about 0.3 percent by weight, from about 0.1 to about 0.3 percent by weight, from about 0.07 to about 0.1 percent by weight, etc.

The non-dairy compositions described herein can contain from about 0.05 to about 0.3 percent by weight of a lactylate, such as stearoyl lactylate, from about 0.1 to about 0.2 percent by weight, from about 0.07 to about 0.2 percent by weight, from about 0.07 to about 0.3 percent by weight, from about 0.1 to about 0.3 percent by weight, from about 0.07 to about 0.1 percent by weight, etc. Lactylates can be identified as calcium stearoyl lactylate (CSL), sodium stearoyl lactylate (SSL), or lactylic esters of fatty acids (LEFA).

The non-dairy compositions described herein can contain from about 0.01 to about 0.1 percent by weight salt, from about 0.05 to about 0.075 percent by weight, from about 0.02 to about 0.08 percent by weight, from about 0.02 to about 0.1 percent by weight, from about 0.03 to about 0.09 percent by weight, etc. Suitable salts include, for example, sodium chloride or potassium chloride.

The non-dairy compositions described herein can contain from about 0.2 to about 0.8 percent by weight of a buffer, such as sodium citrate or dipotassium phosphate, from about 0.2 to about 0.7 percent by weight, from about 0.3 to about 0.6 percent by weight, from about 0.4 to about 0.5 percent by weight, from about 0.3 to about 0.6 percent by weight, from about 0.4 to about 0.7 percent by weight, etc.

The non-dairy compositions described herein can contain from about 0.05 to about 0.5 percent by weight of a flavoring agent, from about 0.1 to about 0.4 percent by weight, from about 0.2 to about 0.4 percent by weight, from about 0.05 to about 0.45 percent by weight, etc.

The non-dairy compositions described herein can contain water and or an alcohol, such as a polyalkylene oxide (a polyethylene oxide, PEO), or ethanol as the remainder of the composition.

The composition is typically in the form of a liquid emulsion, with oil droplets dispersed in a water continuous phase.

Pressurization and Usage

The composition is placed into the container and the container pressurized, typically by injecting a gas. The composition is thus pressurized. Gases adapted for the product pressurization are described below.

In one embodiment the invention involves a method of modifying a beverage, comprising:

providing a beverage, in an opened vessel, delivering the composition of the product onto the beverage, and obtaining a modified beverage comprising the composition.

The beverage is for example coffee or tea. The beverage can be hot, at a temperature above ambient temperature, and the composition can at ambient temperature of lower.

The delivery system is typically provided above the vessel. The delivery can performed with a velocity of composition expelled from the system such that the composition partially dissolves in the beverage and the composition provides a foam portion on the surface of the beverage which remains on the surface of the beverage at least 5 minutes when not subjected to stirring or shaking of the beverage. For example the foam layer can be approximately 10 mm or higher. For example approximately about 70 to about 80 percent of the non-dairy composition can dissolve in the beverage and the remainder can be the foam portion on the surface of the beverage.

Advantageously a sound is emitted from the delivery system upon delivering the composition. In particular, it simulates the sound of a steam pressurized stream of heated liquid emanating from a cappuccino machine, for example with a similar sound pressure level (decibels) and/or frequency content.

It been surprisingly found that the product can be designed to provide a high velocity, a controlled spread of spray and/or a penetration into beverages, and/or a sound, that provide specific foaming and creaming properties and/or easy usage by consumers, and optionally as well the above-mentioned sound.

Thus for a given internal pressure of from about 125 psig to about 165 psig, the valve and spring assembly, for example opening dimensions therein, as well as the actuator, for example the nozzle opening and/or the channel design can be selected to provide such physical features and/or properties. The section of the channel, perpendicular to the direction of the flow, can be uniform along the direction of the flow or can vary along the direction of the flow. For example one can use a channel having a diameter of at least 1.0 millimeter, for example, at least 1.5 millimeters, for example at least 2.0 millimeters, and in particular substantially all along the channel, from connection to valve and spring assembly to nozzle opening. In one embodiment, the section of the channel has diameter of up to 3.0 millimeters, for example, up to 2.5 millimeters, and in one aspect, substantially all along the channel, from connection to valve and spring assembly to nozzle opening. For example the section of the channel can have diameter of about 2.4 millimeters, in one aspect substantially all along the channel, from connection to valve and spring assembly to nozzle opening. The internal diameter of the nozzle and/or of the opening of the nozzle can be varied for example from about 1.0 millimeter to about 3.0 millimeters, in one aspect from about 1.5 millimeter to about 2.5 millimeters, for example about 2.4 millimeters.

The consumer can shake the container to help deliver the composition into a beverage, typically contained in an open vessel such as a cup of a glass, by tilting or turning the container upside down towards the surface of the beverage. The pressurized non-dairy composition produces turbulence in the beverage thus helping to mix in a portion of the non-dairy composition into the liquid beverage and also a foamed component of non-dairy composition on the surface of the liquid beverage.

The pressurized non-dairy composition is ejected into and mixed with a beverage through the actuator. For example, the non-dairy composition is ejected with turbulence into a beverage, such as coffee, for example 6 ounces of beverage such as coffer, placed into a cup (for example a 12 ounce cup with a surface area 54 $cm^2$). At time zero (when composition is initially injected into the coffee or beverage), the resultant foam has a height of approximately 10 cm, more particularly 8 cm, more particularly from 7 to 11 cm, on the surface of the beverage. The resultant foam remains on the surface when undisturbed for at least 10 minutes.

Typically the dose duration is a from about 2 or 3 seconds to about 10 seconds, in one aspect from 4 to 6 seconds, for example 5 seconds, depending upon the consumer's preference for the serving size, the amount of foam, creaminess and/or sweetness of the beverage.

The invention surprisingly involves the careful selection of components to arrive at the desired properties of the non-dairy composition. Especially the specific association of the MPC and caseinate surprisingly provides a different foam quality, with low lacing. It's been surprisingly found as well that palm kernel oil formulas vs palm kernel oil+coconut oil formula vs coconut oil formulas did not perform equally. The palm kernel oil formulas had more lacing and less longevity of the foam (2-3 mins), and were less fluid than coconut based formulae. Palm kernel formulas tended to be a bit soapier/more nitro-like head over shelf life. It was found that coconut oil formulas performed the best (7.4 overall liking out of a possible score of 9 on "The 9 Point Hedonic Scale") vs 7.3 and 7.2 for the coconut oil+palm kernel oil formula blends. The coconut formulae that was most acceptable had a foam layer that lasted over 20 minutes when undisturbed (vs 10-12 mins) for coconut oil+palm kernel oil blends. It also lasted over a minute longer when consumed/agitated (5.5 mins). Also of note, the coconut oil formula resulted in a whiter creamed coffee. Consumer testers noted that the coconut formula was most similar to a latte, had the best foam texture, creamiest foam head, and had a latte-like appearance. Tests with a soy protein did not perform well as the milk protein resulted in a less consistent and less fluid foam over time.

In a series of consumer tests, various stabilizer blends were tested. A powdered coconut oil was used with stabilizers which produced a nitro-beer type of head. While the product scored very well with consumers, it was clear that this type of foam head was not optimized as it scored lower on natural latte appearance, creaminess of foam, foam quality liking, and had a foam duration that lasted 2 minutes less than the optimized variant.

It's been additionally surprisingly found that non-dairy compositions were most appropriate over other types of compositions to provide especially useful velocities, a controlled spread of spray and/or a penetration into beverages for foaming and creaming.

Process of Making the Composition

The composition can be prepared by a process comprising a homogenization step. In particular, the process involves at least 2 homogenization steps.

It was found that single homogenization was consistently inferior to double homogenization as to stability between 45-90 days into shelf life as the foam quality can become inferior. Specifically, webbing, lacing, and uniformity can be all exacerbated under single homogenizations. Particle size and distribution of the emulsion is optimized for double homogenization vs single homogenization. A double homogenizer system results in a unimodal peak with particle size (number-average or weight average <0.5 μm).

A single homogenizer system results in bimodal peaks (indicates high likelihood of instability over time) with a larger particle size (number-average or weight average >0.50 μm).

For optimal performance, double homogenization with an initial viscosity of 100-150 cP at 5° C. is optimal. A viscosity of over 250 cP is less optimal as it can lead to a viscosity over shelf life with compromised performance as the product thickens in the can over time.

A process, can for example, involve the following steps:

a) combining heated water with a mono and diglyceride while being agitated followed by the addition of the sugar agent and the at least one stabilizer, to form a first mixture;

b) combing the first mixture with the oil followed by mixing to form a second mixture;

c) combining the second mixture with a caseinate, a milk protein concentrate and the at least one emulsifier to form a third mixture;

d) combining the third mixture with the at least one buffering agent followed by mixing to form a fourth mixture;

e) optionally, combining the fourth mixture with a flavor, followed by mixing to form a fifth mixture;

f) combining the fourth or fifth mixture with additional water, followed by mixing to form a sixth mixture;

g) subjecting the sixth mixture to a shearing process followed by a first homogenization step to form a seventh mixture;

h) subjecting the seventh mixture to a pasteurization step to form an eighth mixture;

i) subjecting the eighth mixture to a second homogenization step to provide a non-dairy composition.

Step a) is, in one aspect, conducted at a minimum temperature of at least 160° F. The sixth mixture homogenization step g) is, in one aspect, conducted at a temperature range of approximately 125 to about 155° F. The homogenized seventh mixture from step g) is, in one aspect, cooled to a temperature of 45° F. or less prior to step h). The cooled, homogenized seventh mixture of step h) is, in one aspect, pasteurized at a temperature of a least 273° F. for at least 9.8 seconds. The eighth mixture homogenization step of step i) is, in one aspect, conducted at a temperature range of approximately 145 to about 175° F.

From a processing perspective, single homogenization vs double homogenization was tested. With limited shelf life, single homogenization produces similar finished product to double homogenization formulae. Initially, the double homogenization appeared to only lengthen the foam duration by 30 seconds as both single and double homogenized compositions have similar quality. However, after about 45 days in the canister, the products begin to differentiate as the single homogenization leads to a less stable formula. The fat begins to coalesce due to the larger particle size, resulting in a foam with inferior quality (less stable, inconsistent/foam pockets, more lacing, shorter duration, less fluid/some pucking).

Gases for Pressurization of the System

Various gaseous components can be used to pressurize the containers described herein. Suitable gases include nitrogen, $N_2O$ (nitrous oxide), hydrogen, carbon dioxide, argon and combinations thereof. It has advantageously found that use of nitrous oxide helps the non-dairy composition become more emulsified as the nitrous oxide dissolves in the composition. Use of the nitrous oxide helps the composition develop and maintain its creaminess/mouth feel.

The container is generally filled with the gaseous component such that the container is pressurized from about 125 psig to about 165 psig at about 35 to about 50 degrees Fahrenheit. It's been found that it was possible to maintain such a pressure along delivering several servings. In particular, the pressure is maintained at from about 125 psig to about 165 psig before and upon delivering a first serving and in particular before and upon delivering a second serving, and also before and after delivering up to 10 servings, as well as from 4 to 8 servings, of from about 25 to 75 grams of composition, in particular of from 35 to 65 grams, and in one aspect, of from 40 to 60 grams.

Unless defined otherwise, all technical and scientific terms used herein have the same meanings as commonly understood by one of ordinary skill in the art to which this invention belongs. All publications and patents specifically mentioned herein are incorporated by reference in their entirety for all purposes including describing and disclosing the chemicals, instruments, statistical analyses and methodologies which are reported in the publications which might be used in connection with the invention. All references cited in this specification are to be taken as indicative of the level of skill in the art. Nothing herein is to be construed as an admission that the invention is not entitled to antedate such disclosure by virtue of prior invention.

The following paragraphs enumerated consecutively from 1 through 37 provide for various aspects of the present invention. In one embodiment, in a first paragraph (1), the present invention provides:

1. A product comprising a pressurized composition in a delivery system, wherein the composition comprises:

from about 25 to about 40 percent by weight of a sugar agent;

from about 8 to about 16 percent by weight of coconut oil or palm kernel oil or palm oil or mixtures thereof;

from about 0.5 to about 1.5 percent by weight of a milk protein concentrate;

from about 0.5 to about 1.5 percent by weight of a caseinate;

from about 0.2 to about 2 percent by weight of a stabilizer;

from about 0.05 to 0.6 percent by weight of at least one emulsifier, at least one buffering agent, and water.

2. The product of paragraph 1, wherein the stabilizer is microcrystalline cellulose.

3. The product of paragraph 1, wherein the at least one emulsifier comprises monoglycerides and diglycerides, stearoyl lactylate or a mixture thereof.

4. The product of paragraph 3, wherein the at least one emulsifier comprises:

from about 0.05 to 0.3 percent by weight monoglycerides and diglycerides; and from about 0.05 to about 0.3 percent by weight of a stearoyl lactylate;

5. The product of paragraph 1, wherein the at least one buffering agent comprises salt, a buffering salt, or a mixture thereof.

6. The product of paragraph 5, wherein the buffering salt is dipotassium phosphate.

7. The product of paragraph 5, wherein the at least one buffering agent comprises:

from about 0.01 to about 0.1 percent by weight salt; and
from about 0.2 to about 0.8 percent by weight dipotassium phosphate.

8. The product of paragraph 1, further comprising at least one flavoring agent.

9. The product of paragraph 8, wherein the flavoring agent comprises vanilla, hazelnut, amaretto, Irish crème, cinnamon, butter pecan, chocolate, or mixtures thereof.

10. The product of any of paragraphs 1 to 9, wherein the composition is an emulsion.

11. The product of any of paragraphs 1 to 10, wherein total solids of the composition is from about 45 percent to about 55 percent, from about 46 to about 49 percent, from about 45 to about 48 percent by weight.

12. The product of any of paragraphs 1 to 11, having a total fat percentage of from about 11 percent to about 13 percent.

13. The product of any of paragraphs 1 to 12, wherein the sugar is cane sugar.

14. The product of any of paragraphs 1 to 13, wherein the delivery system comprises a container, a valve and spring assembly and an actuator system.

15. The product of paragraph 14, wherein the actuator has a nozzle.

16. The product of any of paragraphs 14 to 15, comprising a gaseous component provides pressurization.

17. The product of paragraph 16, having an internal pressure is from about 125 psi to about 165 psi.

18. The product of paragraph 17, wherein the internal pressure is from about 125 to about 165 psi after at least 2 sequential deliveries of composition.

19. A method of modifying a beverage, comprising:

providing a beverage in an opened vessel,
delivering the composition of the product of any of paragraphs 1 to 18 onto the beverage,
obtaining a modified beverage comprising the composition.

20. The method of paragraph 19, wherein the delivery is performed with a velocity of composition expelled from the system such that the composition partially dissolves in the beverage and the composition provides a foam portion on the surface of the beverage which remains on the surface of the beverage at least 5 minutes when not subjected to stirring or shaking of the beverage.

21. The method of paragraph 21, wherein the foam layer is approximately 10 mm or higher.

22. The method of any of paragraphs 20 or 21, wherein approximately about 70 to about 80 percent of the non-dairy composition dissolves in the beverage and the remainder is the foam portion on the surface of the beverage.

23. The method according to any of paragraphs 19 to 22 comprising the step:

positioning delivery system above the vessel.

24. The method according to any of paragraphs 19 to 23, wherein a sound is emitted from the delivery system that simulates the sound of a steam pressurized stream of heated liquid emanating from a cappuccino machine.

25. The method of any of paragraphs 19 to 24, wherein the beverage is coffee or tea.

26. The method of any of paragraphs 19 to 25, wherein the beverage is hot, at a temperature above ambient temperature, and the composition is at ambient temperature or lower.

27. A beverage obtained according to the method of any of paragraphs 20 to 26.

28. A method to prepare the product according to any to paragraphs 1 to 18, comprising the steps of preparing the composition, placing the composition in a container, and pressurizing the container.

29. The method of paragraph 28, wherein the composition is prepared by a process comprising an homogenization step.

30. The method of paragraph 29, comprising at least 2 homogenization steps.

31. The method of any of paragraphs 28 to 30, where the composition is prepared by a process comprising the following steps:

a) combining heated water with a mono and diglyceride while being agitated followed by the addition of the sugar agent and the at least one stabilizer, to form a first mixture;
b) combing the first mixture with the oil followed by mixing to form a second mixture;
c) combining the second mixture with a caseinate, a milk protein concentrate and the at least one emulsifier to form a third mixture;
d) combining the third mixture with the at least one buffering agent followed by mixing to form a fourth mixture;
e) optionally, combining the fourth mixture with a flavor, followed by mixing to form a fifth mixture;
f) combining the fourth or fifth mixture with additional water, followed by mixing to form a sixth mixture;
g) subjecting the sixth mixture to a shearing process followed by a first homogenization step to form a seventh mixture;
h) subjecting the seventh mixture to a pasteurization step to form an eighth mixture;
i) subjecting the eighth mixture to a second homogenization step to provide a non-dairy composition.

32. The method of paragraph 31, wherein step a) is conducted at a minimum temperature of at least 160° F.

33. The method of paragraph 32, wherein the sixth mixture homogenization step g) is conducted at a temperature range of approximately 125 to about 155° F.

34. The method of paragraph 33, wherein the homogenized seventh mixture from step g) is cooled to a temperature of 45° F. or less prior to step h).

35. The method of paragraph 34, wherein the cooled, homogenized seventh mixture of step h) is pasteurized at a temperature of a least 273° F. for at least 9.8 seconds.

36. The method of paragraph 35, wherein the eighth mixture homogenization step of step i) is conducted at a temperature range of approximately 145 to about 175° F.

37. The method of paragraph 36, wherein the homogenized eighth mixture of step i) is cooled to approximately 45° F. or less prior to transfer to a sterile environment.

The invention will be further described with reference to the following non-limiting Examples. It will be apparent to those skilled in the art that many changes can be made in the embodiments described without departing from the scope of the present invention. Thus the scope of the present invention should not be limited to the embodiments described in this application, but only by embodiments described by the language of the claims and the equivalents of those embodiments. Unless otherwise indicated, all percentages are by weight.

EXAMPLES

Example 1—Product Comprising a Pressurized Non-Dairy Composition

One prepares a product comprising a non-dairy composition, pressurized in a canister container apparatus.

Preparation of a Non-Dairy Composition

Approximately 90% of the total water required for the preparation of the composition is added to a batch tank and heated to at least 160 degrees Fahrenheit with agitation. A liquefier is then filled with the heated water to between ½ and ⅔ full with the water and mono and diglycerides are added. The system is maintained at 160° F. during this transfer. The mixture is agitated for about one minute and then returned to the batch tank.

The liquefier is activated and filled between ½ and ⅔ full. The Avicel is added to the liquefier and the liquid sugar is metered into the liquefier The liquefier is run for about 2 minutes with the outlet valve closed.

The dispersed sugar/Avicel mixture is transferred to a hot mix tank. The recirculation loop between the liquefier, a shear pump and batch tank is activated. The liquefier level is maintained between about ½ and ⅔ full to prevent incorporation of air.

Next, coconut oil is added to the blend tank and recirculated through the liquefier, shear pump and mix tank for at least 2 minutes. To this mixture is then added the caseinate, MPC 70 with the agitator on and the mixture is blended for at least 2 minutes. To this mixture is then added Emplex and the mixture is agitated for an additional 2 minutes or longer. After the additions are complete, the recirculation loop between the liquefier and batch tank is restarted, keeping the liquefier filled between about ½ and ⅔ full.

To the mixture is then added the salt and dipotassium phosphate liquid (50% solids). Flavoring can then be added to the resultant mixture.

Any remaining water is added to the liquefier while recirculating the batch between the liquefier and batch tank for about 10 minutes with the agitator turned off.

After all water has been added, the mixture is recirculated between the liquefier, shear pump and batch tank for at least 10 minutes without the agitator in operation. After 10 minutes, the mixture is transferred to the batch tank.

The mixture is agitated in the batch tank at a high speed of approximately 27 rpm with a blade paddle for approximately 5 minutes.

Within two hours of the preparation of the mixture, the mixture is subjected to a two stage homogenization process (2000/500) (2000 psi at a rate of about 65 liters/minute then 500 psi at 65 liters/minute) at 135 to about 145° F. The heated mixture is cooled to less than 45° F. before transferring the mixture to a hold tank with continued agitation.

The mixture is then subjected to indirect process pasteurization to extend shelf life at a minimum temperature of 273° F. for approximately 10 seconds followed by a second two stage homogenization step as described above except at a temperature of between 165° F. and 175° F.

The doubly homogenized mixture is then cooled to less than 45° F. in a holding tank prior to addition to a container that can be pressurized. A non-dairy composition is provided in the table below:

| | |
|---|---|
| Weight per gallon: | 9.537 Pounds |
| Batch Size: | 700 Gallons |

| Ingredient | % | Lbs./Batch | Gms or MLs |
|---|---|---|---|
| Water | 32.4920 | 2169.133 | 984786.58 |
| Mono & Diglycerides BFP75K | 0.0700 | 4.673 | 2121.60 |
| Emplex (SSL) | 0.0700 | 4.673 | 2121.60 |

-continued

| Ingredient | % | Lbs./Batch | Gms or MLs |
|---|---|---|---|
| Salt | 0.0210 | 1.402 | 636.48 |
| Dipotassium Phosphate Liquid 50% | 0.8800 | 58.748 | 26671.56 |
| Liquid Sugar (67.5 Brix) | 51.7400 | 3454.111 | 1568166.24 |
| MPC 70 - Gay Lea | 1.0000 | 66.759 | 30308.59 |
| Sodium Caseinate | 0.7500 | 50.069 | 22731.44 |
| SC479489 (French Vanilla Flavor) | 0.1320 | | |
| Coconut Oil (Gay Lea) | 12.5000 | 834.488 | 378857.33 |
| Avicel(Cellulose Gel) BV 1518 | 0.3450 | 23.032 | 10456.46 |
| Total | 100.0000 | 6667.088 | |

| | Target | Range |
|---|---|---|
| Total Solids, % | 50.04 | 49.04-51.04 |
| Total Fat, % | 12.64 | 12.14-13.14 |

Method to Fill the Apparatus

Prior to delivery of the non-dairy composition to a canister, the canister is rinsed and sanitized prior to filling.

Approximately 350 grams of non-dairy composition are dosed into a canister at 40° F. from a Serac rotary filler. After transfer of the non-dairy composition to the canister, a progressive opening valve and spring assembly is expeditiously placed and crimped into place about the opening of the container while the canister/composition is shaken. $N_2O$ is injected into the shaking canister through the valve stem of the valve assembly over a period of about 10 to 11 seconds with concurrent shaking (about 400 rpm) to incorporate the nitrous oxide gas into the liquid with an initial pressure of from 125 to about 165 psig. After the canister is filled with components, including gas, the canister is weighed, coded, washed, dried, the actuator/overcap assembly is added, followed by enclosing the actuator/overcap with a tamper evident sleeve. The fully assembly canister is then placed into a case for shipping.

Consumer testing of the design of the delivery system along with the pressurized non-dairy composition shows that the use of the system is intuitive. A consumer would pick up the canister, shake it, and then aim the nozzle at a beverage or food item, press the nozzle to apply pressure to the nozzle to deliver the non-dairy composition in a desired amount to the location/position desired. Generally, it takes the consumer one, two or more tries with the delivery system to attenuate how to adjust the canister, actuator and touch pad to the consumer's liking to deliver the pressurized non-dairy composition to the beverage/food of choice at the rate and amount desired.

Further, the design of the delivery system and the non-dairy composition under pressure provides a "non-laminar" flow of the non-dairy composition. For example, when the delivery system is not shaken prior to use, laminar flow would be produced. Shaking the delivery system and its contents provides non-laminar flow from the nozzle. Without shaking of the canister and the contents therein, the often desired turbulent flow would not be created for the beverage with just the pressure present in the sealed canister.

When the actuator/nozzle are only slightly engaged to release the pressurized contents of the container, it is possible to create designs, patterns, "latte art" and the like on the surface of the beverage.

Foam/Weight and Stability Studies 40 grams of non-dairy composition pressurized in a canister as described above are actuated into 150 grams of brewed coffee in a 12 ounce clear cylindrical mug having a height of 9.5 cm and a diameter of 8.3 cm.

To calculate foam weight, foam is hand spooned off the top of the coffee and weighed.

After 10 Seconds 180 day shelf life sample: 35.0 grams of foam, 5.0 grams dissolve into coffee 75 day shelf life samples: 38.0 grams of foam, 2.0 grams dissolve into coffee After 3 Minutes 180 day shelf life sample: 8.0 grams of foam, 32.0 grams dissolve into coffee 75 day shelf life samples: 8.5 grams of foam, 31.5 grams dissolve into coffee After 5 Minutes 180 day shelf life sample: 3.2 grams of foam, 36.8 grams dissolve into coffee 75 day shelf life samples: 3.5 grams of foam, 36.5 grams dissolve into coffee Height of Foam:

After 10 Seconds 180 day shelf life sample: 8.0 cm of foam/1.0 cm coffee 75 day shelf life sample: 8.0 cm of foam/1.0 cm coffee After 3 Minutes 180 day shelf life sample: 2.0 cm of foam/7.0 cm coffee 75 day shelf life sample: 2.4 cm of foam/6.6 cm coffee After 5 Minutes 180 day shelf life sample: 0.5 cm of foam/8.5 cm coffee 75 day shelf life sample: 0.75 cm of foam/8.25 cm coffee

Example 2—Comparison of Non-Dairy and Dairy Compositions with Pressurized System Samples of "creamer" compositions (commercial, identified by Name, or experimental example 1) are placed into a canister in same conditions as described in Example 1. The products are charged with a given amount of nitrous oxide along with the "creamer". The products are shaken and then dispensed into a cup of coffee having 6 ounces of coffee in a 12 ounce cup having a surface area of 54 $cm^2$ and evaluated for foam height, foam quality, the duration of the foam and taste.

Foam height was determined by measurement of the top of the foam to the interface with the liquid.

Foam quality is determined by visual inspection, where a fluid uniform foam with small to medium sized bubble structure is desired. Defects in the foam include oiling off (oil sheen on top of the foam), non-fluidity (pucking; a mass that moves as one unit), overly large bubbles, too small bubbles, webbing, soapiness, and/or foam pockets.

Taste is determined in view of four parameters: sweetness, creaminess, naturalness of flavor and balance of composition with the beverage, i.e., coffee. Many samples are judged as poor for taste characteristics as they not delivering a finished product that is sweet, creamy and balanced with the coffee. For a majority of products, the coffee comes through as too strong as the sweetness and creaminess is too minimal to mask/complement the coffee bitterness.

TABLE 1

| | Sample Name example | Grams of $N_2O$ | Foam Height | Foam Quality | Duration: <2 min Poor, 2-3 min Avg, 3-5 min Good | Taste |
|---|---|---|---|---|---|---|
| 1 | Bailey's Mudslide | | 8 cm | Tight, Fluid, Oiling off | Poor | Poor, salty |
| 2 | Stok 250 g cold brew coffee, H&H (half and half) 100g | 6.7 | 8 cm, unable to dose correct amount | Poor, big bubbles, changed more dense | Avg | Bitter |
| 3 | Dunkin Extra Extra creamer | | 8 cm | Poor, big bubbles, not fluid | Poor | Sweet, fruit, bitter |
| 4 | Stok 27 5g, H&H 75 g | 7 | 8 cm, unable to dose correct amount | Poor, big bubbles | Good | Creamy, bitter |
| 5 | H&H | | 8 cm, unable to dose correct amount | Avg, cappuccino-like, fluid | Good | Creamy, bitter |
| 6 | Vanilla Soy Creamer | | 3 cm, low foam | Large bubbles, fluid, oily, soapy | Average | Good, sweet, creamy, masks coffee |
| 7 | Stok Cold Brew (single serve retort) | 7.2 | 8 cm, full cup, dosed fully | Good, fluid cascade, creamy appearance | Poor | Coffee, not much sweet |
| 8 | 2% milk | | 8 cm, no fully dose | Nitro bubbles, dense, | Good | Coffee, not much sweet |

TABLE 1-continued

| | Sample Name example | Grams of $N_2O$ | Foam Height | Foam Quality | Duration: <2 min Poor, 2-3 min Avg, 3-5 min Good | Taste |
|---|---|---|---|---|---|---|
| 9 | Table Cream | 7.8 | 8 cm, no fully dose | Large bubbles, fluid, soapy, lacing | Good | Creamy |
| 10 | Coconut cream | | 8 cm, fully dosed, did not go in solution, sat on top | Poor, inconsistent | Good | Black coffee and cream on top |
| 11 | Evaporated milk | 7.2 | 8 cm, no able to fully dose, | Good, dense, variable | Good | Creamy, bitter |
| 12 | Coffeemate Natural Bliss Vanilla | 7.1 | 8 cm, not able to fully dose | Big bubbles, variable network | Good | Okay, not sweet or creamy enough (35g dose) |
| 13 | Sweetened Condensed Milk | 6.3 g (>30 sec fill) | 0 cm | No foam, came out as syrup | Poor | Black coffee, when stirred, the 11g dose did cream, but tasted like black coffee |
| 14 | Starbucks Vanilla Frappe | 6.9 g | 8 cm | Dense, uniform, mostly sits on top | Good | Cooked dairy, creamed but not sweet |
| 15 | Heavy Whipping Cream | 5.6 g | 7.5 cm | Variable, sits on top, thick | Good | Foam on top, coffee barely creamed |
| 16 | Soymilk | 4.75 | 7.5 cm | Variable, lacing, cappuccino-like | Good | Diluted coffee |
| 17 | Vanilla Soy Milk | 7.3 | 8 cm | Variable, lacing, cappuccino-like | Good | Not good, diluted coffee |
| 18 | 20 g coffee/ 80 g water | 7.3 g | 8 cm | Cobwebs, dense, cascading, black coffee, broken | Good | Strong coffee |
| 19 | Open Nature Dairy Creamer | 7.1 g | 8 cm | Dense, cascading, lacing, | Good | Good, sweet, creamy, masks coffee |
| 20 | Promised Land Midnight Chocolate Milk | 7.2 | 8 cm | Tight | Good | Poor |
| 21 | Example 1 | 7.2 | 8 cm | Tight, fluid, low lacing, cappuccino like | Good | Excellent; high creaminess of coffee and foam, sweet, complements coffee |

Example 3: Comparison of Non-Dairy Compositions with Pressurized System

Various experimental compositions were prepared, placed into canisters under the same conditions as described in Example 1, identical for all compositions and canisters. The products underwent the same evaluations as described in Example 2. The compositions are reported on Table 2, where ingredients are reported as wt %. The evaluations are reported on Table 3.

Ingredients:

Coconut is 98% saturation oil, marketed by Caldic.

Palm Kernel Oil/Coconut Oil blend is 88% saturation oil blend, marketed by Caldic.

Palm Kernel Oil is Regal 95 marketed by Cargill.

Palm Oil is 48% saturation oil marketed by ADM.

Whey Protein Isolate is Whey Protein Isolate 90 marketed by Milk Specialties.

Soy Protein Isolate is Versa Whip marketed by Kerry Ingredients.

Hydrolyzed Milk Protein is Hyfoama marketed by Kerry Ingredients.

Albumen is Instant Egg Albumen marketed by Agropur.

Milk Casein Concentrate is Milk Casein Concentrate marketed by Milk Specialties

Powdered Coconut Oil is marketed by Bay Valley

Starch is Emulsifying Starch-Emcap marketed by Cargill

Preparation of Compositions

Unless otherwise specified the products are prepared with a two-step homogenization process according to the procedure described in Example 1, where the nature and the amounts for the ingredients might be changed according to Table 2.

Where specific products are prepared by a single homogenization process, as described in Example 1, expect that there is no upstream homogenizer after batching/before filling into the pre-process hold tank. There is only one homogenizer step for this process, which is located after the processing kill-step.

Evaluations

Taste: Taste is tested with 100 consumers having product dosed for them by a single person so each sample is consistent. There is no control as the purpose is to determine which base (foam quality/duration) was preferred.

TABLE 2

| Ingredients | Example 1 | Composition 3.1 | Composition 3.2 | Composition 3.3 | Composition 3.4 |
|---|---|---|---|---|---|
| Liquid Sugar (67.5 Brix) | 51.74% | 55.00% | 48.77% | 48.77% | 48.77% |
| Oil | | | | | |
| Palm Kernel Oil | | 11.75% | | | |
| Palm Oil | | | 8.40% | 8.40% | |
| Coconut Oil | 12.50% | | | | 6.00% |
| Powdered Coconut Oil | | | | | |
| Proteins - Foaming Agent(s) | | | | | |
| MPC 70 Gay Lea | 1.00% | | | | |
| MPC 85 - Agropur | | | | 2.30% | |
| Sodium Caseinate | 0.75% | 1.00% | 0.75% | 0.75% | 0.60% |
| Albumen | | | 2.30% | | |
| Soy Protein Isolate | | | | | |
| Hydrolyzed Milk Protein | | | | | |
| Whey Protein Isolate | | | | | |
| Gums - Foam Stabilize | | | | | |
| Avicel (Cellulose Gel) BV 1518 | 0.34% | | | | |
| Other | | Avicel RC 571 0.60% | Carrageenan - 0.09% | | Carrageenan - 0.05% |
| Emulsifier(s) | | | | | |
| Mono & Diglycerides BFP75K | 0.07% | 0.30% | 0.07% | 0.07% | 0.07% |
| Emplex (SSL) | 0.07% | 0.20% | 0.07% | 0.07% | 0.07% |
| Buffering Agent(s) | | | | | |
| Dipotassium Phosphate Liquid 50% | 0.88% | 0.80% | 0.88% | 0.88% | 0.88% |
| Other | | | | | |
| Salt | 0.021% | 0.021% | 0.021% | 0.021% | 0.021% |
| Flavor | 0.13% | 0.20% | 0.12% | 0.13% | 0.38% |
| Sta-Crème | | 3.00% | | | |
| Water | To 100.00% | To 100.00% | To 100.00% | To 100.00% | To 100.00% |

| Ingredient | Composition 3.5 | Composition 3.6 | Composition 3.7 | Composition 3.8 Example 1 with 1% higher fat | Composition 3.9 |
|---|---|---|---|---|---|
| Sugar Liquid (67.5 Brix) | 48.77% | 48.77% | 48.77% | 51.74% | 48.77% |
| Oil | | | | | |
| Palm Kernel Oil - Cargill Regal 95 | 13.00% | 13.00% | | | 4.56% |
| Palm Oil | | | | | |
| Coconut Oil | | | | 13.50% | 6.84% |
| Powdered Coconut Oil - Bay Valley | | | 6.00% | | |

TABLE 2-continued

| | | | | | |
|---|---|---|---|---|---|
| Proteins - Foaming Agent(s) | | | | | |
| MPC 70 Gay Lea | | | | 1.00% | 1.00% |
| Sodium Caseinate | 1.12% | 1.12% | 0.60% | 0.75% | 0.75% |
| Milk Casein Concentrate | | | 2.00% | | |
| Albumen | | | | | |
| Soy Protein Isolate | | | | | |
| Hydrolyzed Milk Protein | | | | | |
| Whey Protein Isolate | | | | | |
| Gums - Foam Stabilize | | | | | |
| Avicel(Cellulose Gel) BV 1518 | | | | 0.34% | 0.60% |
| Other | Carrageenan - 0.07% | Starch - 1.00% Carrageenan - 0.07% | Carrageenan - 0.07% | | |
| Emulsifier(s) | | | | | |
| Mono & Diglycerides BFP75K | 0.07% | 0.07% | 0.07% | 0.07% | 0.07% |
| Emplex (SSL) | 0.07% | 0.07% | 0.07% | 0.07% | 0.07% |
| Buffering Agent(s) | | | | | |
| Dipotassium Phosphate Liquid 50% | 0.88% | 0.88% | 0.88% | 0.88% | 0.88% |
| Other | | | | | |
| Salt | 0.021% | 0.021% | 0.021% | 0.021% | 0.021% |
| Flavor | | | 0.38 | 0.13% | 0.13% |
| Sta-Crème | | | | | |
| Water | To 100.00% | To 100.00% | To 100.00% | To 100.00% | To 100.00% |

| Ingredient | Composition 3.10 | Composition 3.11 | Composition 3.12 | Composition 3.13 |
|---|---|---|---|---|
| Sugar | 48.77% | 48.77% | 48.77% | 48.77% |
| Oil | | | | |
| Palm Kernel Oil | 4.56% | 4.56% | | |
| Palm Oil | | | 11.4% | |
| Coconut Oil | 6.84% | 6.84% | | 9.54% |
| Proteins - Foaming Agent(s) | | | | |
| MPC 70 Gay Lea | | | 1.0% | |
| Sodium Caseinate | 0.75% | 0.75% | 0.75% | 0.75% |
| Albumen | | | | |
| Soy Protein Isolate | 0.50% | | | |
| Hydrolyze Milk Protein | | 0.50% | | |
| Whey Protein Isolate 90 | | | | 1.15% |
| Gums - Foam Stabilize | | | | |
| Avicel(Cellulose Gel) BV 1518 | 1.10% | 1.10% | 0.60% | |
| Other | | | | Guar Gum (TIC) 0.10% Carrageenan 0.09% |
| Emulsifier(s) | | | | |
| Mono & Diglycerides BFP75K | 0.07% | 0.07% | 0.07% | 0.07% |
| Emplex (SSL) | 0.07% | 0.07% | 0.07% | 0.07% |
| Buffering Agent(s) | | | | |
| Dipotassium Phosphate Liquid 50% | 0.88% | 0.88% | 0.88% | 0.88% |
| Other | | | | |
| Salt | 0.021% | 0.021% | 0.021% | 0.021% |
| Flavor | 0.13% | 0.13% | 0.13% | 0.13% |
| Sta-Crème | | | | |
| Water | To 100.00% | To 100.00% | To 100.00% | To 100.00% |

| Ingredient | Composition 3.14 | Composition 3.15 | Composition 3.16 | Composition 3.17 |
|---|---|---|---|---|
| Sugar Liquid (67.5 Brix) - | 51.74% | 48.77% | 48.77% | 51.74% |
| Oil | | | | |
| Palm Kernel Oil | | | | |
| Palm Oil | | 11.40% | 11.40% | |
| Coconut Oil | 12.50% | | | 12.50% |
| Proteins - Foaming Agent(s) | | | | |
| MPC 70 Gay Lea | 0.00% | | | 1.00% |
| Sodium Caseinate | | | | |
| Albumen | 1.50% | 0.75% | 0.75% | 0.75% |
| Milk Casein Concentrate - Milk | | | | |

TABLE 2-continued

| | | | | |
|---|---|---|---|---|
| Specialities | | 3.00% | 2.00% | |
| Soy Protein Isolate | | | | |
| Hydrolyze Milk Protein | | | | |
| Whey Protein Isolate | | | | |
| Gums - Foam Stabilize | | | | |
| Avicel (Cellulose Gel) BV 1518 | 0.34% | | | 0.00% |
| Other | | Guar (TIC Gums) 0.10% | Gum Arabic (TIC - FT Powder) - 0.132% Carrageenan - 0.09% | |
| Emulsifier(s) | | | | |
| Mono & Diglycerides BFP75K | 0.07% | 0.07% | 0.07% | 0.07% |
| Emplex (SSL) | 0.07% | 0.07% | 0.07% | 0.07% |
| Buffering Agent(s) | | | | |
| Dipotassium Phosphate Liquid 50% | 0.88% | 0.88% | 0.88% | 0.88% |
| Other | | | | |
| Salt | 0.021% | 0.021% | 0.021% | 0.021% |
| Flavor | 0.13% | | | 0.13% |
| Sta-Crème | | | | |
| Water | To 100.00% | To 100.00% | To 100.00% | To 100.00% |

| Ingredient | Composition 3.18 |
|---|---|
| Sugar Liquid (67.5 Brix) - | 51.74% |
| Oil | |
| Palm Kernel Oil at 88% saturation | |
| Palm Oil | |
| Coconut Oil | 12.50% |
| Proteins - Foaming Agent(s) | |
| MPC 70 Gay Lea | 0.00% |
| Sodium Caseinate | 0.75% |
| Albumen | |
| Soy Protein Isolate | |
| Hydrolyze Milk Protein | |
| Whey Protein Isolate 90 | |
| Gums - Foam Stabilize | |
| Avicel (Cellulose Gel) BV 1518 | 0.34% |
| Other | |
| Emulsifier(s) | |
| Mono & Diglycerides BFP75K | 0.07% |
| Emplex (SSL) | 0.07% |
| Buffering Agent(s) | |
| Dipotassium Phosphate Liquid 50% | 0.88% |
| Other | |
| Salt | 0.021% |
| Flavor | 0.13% |
| Sta-Crème | |
| Water | To 100.00% |

TABLE 3

| Composition | Foam Height Initially | Foam Quality | Duration: <2 min Poor, 2-3 min Avg, 3-5 min Good; Great 5+ | Taste |
|---|---|---|---|---|
| 3.1 | 5 cm | Whipped cream; so thick that it did not penetrate the coffee. It sat on top like a whipped cream | Great | |

TABLE 3-continued

| Composition | Foam Height Initially | Foam Quality | Duration: <2 min Poor, 2-3 min Avg, 3-5 min Good; Great 5+ | Taste |
|---|---|---|---|---|
| 3.2 | 5 cm | Poor, coagulated as hit coffee, non-uniform, very stiff/dense | Good | Poor, eggy/sulfry |

TABLE 3-continued

| Composition | Foam Height Initially | Foam Quality | Duration: <2 min Poor, 2-3 min Avg, 3-5 min Good; Great 5+ | Taste |
|---|---|---|---|---|
| 3.3 | 6 cm | Good, more cappuccino like | Good | Good, sweet, fruity, creamy |
| 3.4 | 4 cm | Nitro-beer like, slight fizzing, very uniform and tight | Avg, dissolves quickly | Slight creamed corn taste, less creamy |
| 3.5 | 5 cm | Nitro beer like, low lacing, dissipates quickly | Avg, lasts 30 sec longer than #6 | Ok |
| 3.6 | 5 cm | Nitro beer like, low lacing, dissipates very quickly | Avg, last 30 seconds less with starch | Ok, slight starch taste that masks some sweetness |
| 3.7 | 4 cm | Nitro-beer like, slight fizzing, very uniform and tight, small bubbles | Avg; 2 min 30 sec | Overall liking score = 7.3 Foam Texture Liking score = 6.8 |
| 3.8 | 6 cm | Moderate/tall foam, cappuccino-like, very low lacing, best whitening | Great; 5 min 30 sec | Overall liking score = 7.4 Foam Texture Liking score = 7.3 |
| 3.9 | 7 cm | Large Bubbles, pop quickly, tall foam, open network, high lacing | Good; 5 min | Overall liking score = 7.3 Foam Texture Liking score = 7.2 |
| 3.10 | 5 cm | Moderate foam height with open network and larger bubbles, no lacing | Good; 4 min | Overall liking score = 7.2 Foam Texture Liking score = 7.1 |
| 3.11 | 5 cm | Moderate foam height with open network and larger bubbles, some lacing | Good, 3.5 min hydrolyzed milk protein did not help | Good, however there is some dairy protein taste detectable |
| 3.12 | 5 cm | Moderate foam height that collapses quickly. Some pockets though mostly uniform | Average - 2.5 min | Good, however lacking in creaminess mouthfeel |
| 3.13 | 5 cm | Moderate Foam, some variability with large bubbles, lacing, some webbing | Good - 3.5 min | Ok, but some protein notes detected |
| 3.14 | 6 cm | Cappuccino-like initially, quickly collapsing | Good 3 min 30 sec | |
| 3.15 | 6 cm | Gel-like, unnatural, very rigid. Substantial lacing and variation of bubble size | Good | Strong protein note, gelled texture |
| 3.16 | 6 cm | Bigger bubbles and less quality foam than example 1. Cellulose gel makes a tighter foam than gum arabic. | Good, slightly shorter duration than example 1 | Similar taste as example 1 |
| 3.17 | 6 cm | Less uniform compared to example 1, with variation in bubble size and more lacing | One minute shorter duration that example 1 | Less creamy mouthfeel and texture compared to example 1; otherwise similar taste |
| 3.18 | 5 cm | More lacing and more variation in bubble size compared to example 1. | 1.5 minutes shorter in duration that example 1 | Less rigid texture and creaminess perception compared to example 1; otherwise similar taste |

Although the present invention has been described with reference to preferred embodiments, persons skilled in the art will recognize that changes may be made in form and detail without departing from the spirit and scope of the invention. All references cited throughout the specification, including those in the background, are incorporated herein in their entirety. Those skilled in the art will recognize, or be able to ascertain, using no more than routine experimentation, many equivalents to specific embodiments of the invention described specifically herein. Such equivalents are intended to be encompassed in the scope of the following claims.

What is claimed is:

1. A pressurized product comprising a non-dairy composition contained within a delivery system comprising a container, a valve and spring assembly, and an actuator including a nozzle, wherein the non-dairy composition comprises:

from about 25 to about 40 percent by weight of a sugar cane;

from about 8 to about 16 percent by weight of coconut oil;

from about 0.5 to about 1.5 percent by weight of a milk protein concentrate, comprising a protein content of greater than 50% by weight and a lactose content of less than 20% by weight;

from about 0.5 to about 1.5 percent by weight of sodium caseinate;

from about 0.2 to about 2 percent by weight of microcrystalline cellulose;

from about 0.05 to about 0.3 percent by weight mono- and diglycerides;

from about 0.05 to about 0.3 percent by weight stearoyl lactylate;
from about 0.2 to about 0.8 percent by weight dipotassium phosphate;
and
water,
wherein:
the non-dairy composition is prepared by a process comprising:
a first two-stage homogenization conducted at about 2000 psi in a first stage and about 500 psi in a second stage at a temperature of about 135-145° F.,
pasteurization, and
a second two-stage homogenization conducted at about 2000 psi in a first stage and about 500 psi in a second stage at a temperature of about 165-175° F.;
the non-dairy composition has a unimodal peak particle size distribution in which a number-average or weight-average particle size is less than 0.5 microns;
the non-dairy composition has an initial viscosity of about 100 to about 150 cP at 5° C.;
and
the non-dairy composition has a shelf life of at least 180 days.

2. The product of claim 1, wherein the composition comprises a flavoring agent, the flavoring agent including vanilla, hazelnut, amaretto, Irish crème, cinnamon, butter pecan, chocolate, or mixtures thereof.

3. The product of claim 1, wherein the composition is an emulsion.

4. The product of claim 1, wherein total solids of the composition is from about 45 percent to about 55 percent by weight.

5. The product of claim 1, wherein the composition includes a total fat percentage of from about 11 percent to about 13 percent.

6. The product of claim 1, having an internal pressure from about 125 psi to about 165 psi.

7. The product of claim 6, wherein the internal pressure is from about 125 to about 165 psi after at least 2 sequential deliveries of composition.

8. The product of claim 4, wherein total solids of the composition is from about 46 to about 49 percent by weight.

9. The product of claim 8, wherein total solids of the composition is from about 45 to about 48 percent by weight.

10. The product of claim 1, wherein the composition is substantially free of microparticulated whey proteins.

* * * * *